(12) United States Patent
Waters

(10) Patent No.: US 8,757,831 B2
(45) Date of Patent: Jun. 24, 2014

(54) HEADGEAR HAVING AN ELECTRICAL DEVICE AND POWER SOURCE MOUNTED THERETO

(76) Inventor: Michael Waters, Aspen, CO (US)

( * ) Notice: Subject to any disclaimer, the term of this patent is extended or adjusted under 35 U.S.C. 154(b) by 495 days.

(21) Appl. No.: 12/819,067

(22) Filed: Jun. 18, 2010

(65) Prior Publication Data

US 2010/0313335 A1    Dec. 16, 2010

Related U.S. Application Data

(63) Continuation-in-part of application No. PCT/US2008/087542, filed on Dec. 18, 2008.

(60) Provisional application No. 61/014,726, filed on Dec. 18, 2007, provisional application No. 61/330,185, filed on Apr. 30, 2010.

(51) Int. Cl.
*F21V 21/084*    (2006.01)

(52) U.S. Cl.
USPC ........... 362/106; 362/253; 362/234; 200/566; 200/568

(58) Field of Classification Search
USPC .............. 362/105, 106, 253, 234, 249.02, 11; 200/564, 565, 566, 568, 61.31
See application file for complete search history.

(56) References Cited

U.S. PATENT DOCUMENTS

| | | | |
|---|---|---|---|
| 645,984 A * | 3/1900 | Tournier | 200/51.17 |
| 909,742 A * | 1/1909 | Borchert | 200/51.14 |
| 1,098,628 A * | 6/1914 | Hyman | 362/112 |
| 1,109,415 A | 9/1914 | Harris | |
| 1,255,265 A | 2/1918 | Zachara | |
| 1,323,822 A * | 12/1919 | Bramming | 200/51.13 |
| 1,572,210 A | 2/1926 | Kolibas | |
| 1,744,777 A | 1/1930 | Lundgren | |
| 1,749,998 A | 3/1930 | Collins | |

(Continued)

FOREIGN PATENT DOCUMENTS

| | | |
|---|---|---|
| AU | 11785/76 | 9/1977 |
| AU | 63109/94 | 11/1994 |

(Continued)

OTHER PUBLICATIONS

Notification of Transmittal of the International Search Report and the Written Opinion of the International Searching Authority, or the Declaration from the International Bureau of WIPO for related International Application No. PCT/US2011/034695 dated Oct. 28, 2011, 12 pages.

(Continued)

*Primary Examiner* — Ismael Negron
(74) *Attorney, Agent, or Firm* — Fitch, Even, Tabin & Flannery, LLP

(57) ABSTRACT

Headgear includes a brim portion and a power source. In one form, a camera is mounted to the brim portion such that the power source powers the camera. The camera includes a lens mounted to the brim portion and control circuitry for operating the camera mounted to the brim portion at least partially between upper and lower major surfaces thereof. In alternate forms, a heat sink can be mounted to the brim portion to dissipate heat generated by powered components of the headgear, such as the camera, a circuit board, a light source, or the like, and a rotary switch can be mounted to the brim portion for energizing the a light source and/or operating the camera.

20 Claims, 16 Drawing Sheets

(56) References Cited

U.S. PATENT DOCUMENTS

| | | | |
|---|---|---|---|
| D137,375 S | 2/1944 | Heit | |
| 2,369,829 A * | 2/1945 | Johnson | 224/181 |
| 2,373,553 A * | 4/1945 | Fetterman | 362/205 |
| 2,461,254 A | 2/1949 | Bassett | |
| 2,473,394 A | 6/1949 | Scott | |
| 2,540,435 A * | 2/1951 | Ferguson | 200/564 |
| 2,552,764 A | 5/1951 | Bedford, Jr | |
| 2,638,532 A | 5/1953 | Brady | |
| 2,640,980 A | 6/1953 | Prupis | |
| 2,705,751 A | 4/1955 | Harris et al. | |
| 2,788,439 A | 4/1957 | Hesse | |
| 2,904,670 A | 9/1959 | Calmes | |
| 2,978,696 A | 4/1961 | Keller et al. | |
| 3,008,040 A | 11/1961 | Moore | |
| 3,032,647 A | 5/1962 | Wansky et al. | |
| 3,040,881 A | 6/1962 | McNeil | |
| 3,057,992 A * | 10/1962 | Ridgway | 362/200 |
| 3,060,308 A | 10/1962 | Fortuna | |
| 3,123,208 A | 3/1964 | Barnum et al. | |
| 3,184,058 A | 5/1965 | Crowther | |
| 3,201,771 A | 8/1965 | Proulx | |
| 3,350,552 A | 10/1967 | Lawrence | |
| 3,358,137 A | 12/1967 | Sinclair et al. | |
| 3,491,374 A | 1/1970 | Frangos | |
| 3,537,909 A | 11/1970 | Horton | |
| 3,602,759 A | 8/1971 | Evans et al. | |
| 3,666,901 A | 5/1972 | Weinhart | |
| 3,749,902 A | 7/1973 | Drew | |
| 3,845,389 A | 10/1974 | Phillips et al. | |
| 3,947,676 A | 3/1976 | Battilana et al. | |
| 3,963,917 A | 6/1976 | Romano | |
| 4,005,776 A | 2/1977 | Seeley | |
| 4,011,600 A | 3/1977 | Malk | |
| 4,053,688 A | 10/1977 | Perkins et al. | |
| 4,176,932 A * | 12/1979 | Young et al. | 396/155 |
| 4,186,429 A | 1/1980 | Johnston | |
| 4,210,952 A | 7/1980 | Ressmeyer | |
| 4,231,079 A | 10/1980 | Heminover | |
| 4,268,894 A * | 5/1981 | Bartunek et al. | 362/158 |
| 4,283,127 A | 8/1981 | Rosenwinkel et al. | |
| 4,298,913 A | 11/1981 | Lozar | |
| 4,364,107 A | 12/1982 | Wieczorek et al. | |
| 4,392,183 A * | 7/1983 | Ostlund et al. | 362/11 |
| 4,398,237 A * | 8/1983 | Doyel | 362/186 |
| 4,406,040 A | 9/1983 | Cannone | |
| 4,425,531 A * | 1/1984 | Holmes | 315/241 P |
| D272,733 S | 2/1984 | Cosmos et al. | |
| 4,442,478 A * | 4/1984 | Stansbury | 362/489 |
| 4,462,064 A | 7/1984 | Schweitzer | |
| 4,470,263 A | 9/1984 | Lehovec et al. | |
| 4,483,021 A | 11/1984 | McCall | |
| 4,516,157 A | 5/1985 | Campbell | |
| 4,521,831 A | 6/1985 | Thayer | |
| 4,541,698 A | 9/1985 | Lerner | |
| 4,551,857 A | 11/1985 | Galvin | |
| 4,559,516 A | 12/1985 | Schott et al. | |
| 4,570,206 A | 2/1986 | Deutsch | |
| 4,602,191 A | 7/1986 | Davila | |
| 4,604,760 A | 8/1986 | Coin | |
| 4,638,410 A | 1/1987 | Barker | |
| 4,642,817 A | 2/1987 | Ferstenfeld | |
| 4,665,568 A | 5/1987 | Stutes | |
| 4,669,610 A | 6/1987 | Lindsey et al. | |
| 4,680,815 A | 7/1987 | Hirsch et al. | |
| 4,794,496 A | 12/1988 | Lanes et al. | |
| 4,817,212 A | 4/1989 | Benoit | |
| 4,827,384 A | 5/1989 | Von Schlemmer | |
| 4,872,218 A | 10/1989 | Holt | |
| 4,901,210 A | 2/1990 | Hanabusa | |
| 4,901,211 A | 2/1990 | Shen | |
| 4,945,458 A | 7/1990 | Batts et al. | |
| 4,951,068 A | 8/1990 | Ichikawa et al. | |
| 4,959,760 A | 9/1990 | Wu | |
| 4,963,045 A | 10/1990 | Willcox | |
| 4,991,068 A | 2/1991 | Mickey | |
| 4,998,187 A | 3/1991 | Herrick | |
| D316,932 S | 5/1991 | Escher, Jr. | |
| 5,039,829 A | 8/1991 | Brucksch | |
| 5,060,814 A | 10/1991 | Oglesbee | |
| 5,068,771 A | 11/1991 | Savage, Jr. | |
| 5,070,436 A | 12/1991 | Alexander et al. | |
| 5,088,127 A | 2/1992 | Thornock | |
| 5,111,366 A | 5/1992 | Rife et al. | |
| 5,113,325 A | 5/1992 | Eisenbraun | |
| 5,122,943 A | 6/1992 | Pugh | |
| 5,140,116 A | 8/1992 | Schmitt-Walter | |
| 5,140,220 A | 8/1992 | Hasegawa | |
| 5,143,443 A | 9/1992 | Madsen | |
| 5,163,420 A | 11/1992 | Van Dear Bel | |
| 5,165,789 A | 11/1992 | Womack | |
| 5,189,512 A | 2/1993 | Cameron et al. | |
| 5,193,220 A | 3/1993 | Ichinohe et al. | |
| 5,193,347 A | 3/1993 | Apisdorm | |
| 5,218,385 A | 6/1993 | Lii | |
| 5,224,772 A | 7/1993 | Fustos | |
| 5,230,558 A | 7/1993 | Jong | |
| 5,238,344 A | 8/1993 | Nagayama | |
| 5,245,516 A | 9/1993 | de Haas et al. | |
| 5,249,675 A | 10/1993 | Strauss et al. | |
| 5,278,734 A | 1/1994 | Ferber | |
| D349,123 S | 7/1994 | Cooley et al. | |
| 5,329,637 A | 7/1994 | Walker | |
| 5,331,333 A | 7/1994 | Tagawa et al. | |
| 5,331,357 A | 7/1994 | Cooley et al. | |
| 5,357,409 A | 10/1994 | Glatt | |
| 5,363,291 A | 11/1994 | Steiner | |
| 5,404,593 A | 4/1995 | Kronenberger | |
| 5,408,393 A | 4/1995 | Becker | |
| 5,410,746 A | 4/1995 | Gelber | |
| 5,418,565 A | 5/1995 | Smith | |
| 5,423,419 A | 6/1995 | Wentz et al. | |
| 5,438,698 A | 8/1995 | Burton et al. | |
| 5,452,190 A | 9/1995 | Priesemuth | |
| 5,460,346 A | 10/1995 | Hirsch | |
| 5,463,538 A | 10/1995 | Womack | |
| 5,467,992 A | 11/1995 | Harkness | |
| 5,485,358 A | 1/1996 | Chien | |
| 5,503,637 A | 4/1996 | Kyricos et al. | |
| 5,508,900 A | 4/1996 | Norman | |
| 5,510,961 A | 4/1996 | Peng | |
| 5,541,767 A | 7/1996 | Murphy et al. | |
| 5,541,816 A | 7/1996 | Miserendino | |
| 5,542,627 A | 8/1996 | Crenshaw et al. | |
| 5,546,099 A | 8/1996 | Quint et al. | |
| 5,564,128 A | 10/1996 | Richardson | |
| 5,567,038 A | 10/1996 | Lary | |
| 5,575,554 A | 11/1996 | Guritz | |
| 5,610,678 A | 3/1997 | Tsuboi et al. | |
| 5,655,374 A | 8/1997 | Santilli | |
| 5,667,291 A | 9/1997 | Caplan et al. | |
| 5,667,292 A | 9/1997 | Sabalvaro, Jr. | |
| 5,676,449 A | 10/1997 | Newsome | |
| 5,677,079 A | 10/1997 | DeZorzi | |
| 5,680,718 A | 10/1997 | Ratcliffe et al. | |
| 5,688,039 A | 11/1997 | Johnson | |
| 5,692,244 A | 12/1997 | Johnson et al. | |
| 5,708,449 A | 1/1998 | Heacock et al. | |
| 5,718,335 A | 2/1998 | Boudreaux | |
| 5,722,762 A | 3/1998 | Soll | |
| 5,730,290 A | 3/1998 | Futo | |
| 5,741,060 A | 4/1998 | Johnson | |
| 5,743,621 A | 4/1998 | Mantha et al. | |
| 5,758,947 A | 6/1998 | Glatt | |
| 5,786,665 A | 7/1998 | Ohtsuki et al. | |
| 5,800,278 A | 9/1998 | Variano | |
| 5,822,636 A | 10/1998 | Cho | |
| 5,829,063 A | 11/1998 | Cheng | |
| 5,829,860 A * | 11/1998 | Lawther et al. | 362/11 |
| 5,836,673 A | 11/1998 | Lo | |
| 5,845,778 A | 12/1998 | Hickey, Jr. | |
| 5,845,987 A | 12/1998 | Painter | |
| 5,857,220 A | 1/1999 | Erny et al. | |
| 5,865,333 A | 2/1999 | Wolfe | |
| 5,871,271 A | 2/1999 | Chien | |

(56) References Cited

U.S. PATENT DOCUMENTS

| | | | |
|---|---|---|---|
| D407,187 S | 3/1999 | Makki | |
| 5,876,241 A | 3/1999 | Frantz | |
| 5,894,604 A | 4/1999 | Crabb et al. | |
| 5,918,966 A | 7/1999 | Arnold | |
| 5,920,910 A | 7/1999 | Calvo | |
| 5,921,674 A | 7/1999 | Koczi | |
| 5,922,489 A | 7/1999 | Adachi | |
| 5,931,693 A | 8/1999 | Yamazaki | |
| 5,946,071 A | 8/1999 | Feldman | |
| 5,982,969 A | 11/1999 | Sugiyama et al. | |
| 5,997,165 A | 12/1999 | Lehrer | |
| 6,005,536 A | 12/1999 | Beadles et al. | |
| 6,007,212 A | 12/1999 | Chan | |
| 6,007,213 A | 12/1999 | Baumgartner | |
| 6,009,563 A | 1/2000 | Swanson et al. | |
| 6,012,822 A | 1/2000 | Robinson | |
| 6,012,827 A | 1/2000 | Caplan et al. | |
| 6,021,525 A | 2/2000 | Mertins | |
| 6,023,788 A | 2/2000 | McCallum et al. | |
| 6,028,627 A | 2/2000 | Helmsderfer | |
| 6,032,291 A | 3/2000 | Asenguah et al. | |
| 6,032,293 A | 3/2000 | Makki | |
| 6,056,413 A | 5/2000 | Urso | |
| D428,431 S | 7/2000 | Jordan | |
| 6,086,214 A | 7/2000 | Ridge | |
| 6,087,037 A | 7/2000 | Rieder | |
| 6,088,053 A | 7/2000 | Hammack et al. | |
| 6,094,749 A | 8/2000 | Proctor | |
| 6,113,243 A | 9/2000 | Saul | |
| 6,113,244 A | 9/2000 | Baumgartner | |
| 6,116,745 A | 9/2000 | Yei | |
| 6,124,056 A | 9/2000 | Kimura | |
| 6,126,294 A | 10/2000 | Koyama et al. | |
| 6,167,570 B1 | 1/2001 | Su | |
| 6,168,286 B1 | 1/2001 | Duffy | |
| 6,172,657 B1 | 1/2001 | Kamakura et al. | |
| 6,174,075 B1 | 1/2001 | Fuwausa | |
| 6,206,543 B1 | 3/2001 | Henry | |
| 6,236,007 B1 * | 5/2001 | Ho | 200/564 |
| 6,237,147 B1 | 5/2001 | Brockman | |
| 6,240,566 B1 | 6/2001 | Scantlin | |
| 6,244,721 B1 | 6/2001 | Rodriguez et al. | |
| 6,250,769 B1 | 6/2001 | Kirk | |
| 6,256,795 B1 | 7/2001 | Habel | |
| 6,290,368 B1 | 9/2001 | Lehrer | |
| 6,306,538 B1 | 10/2001 | Saitoh et al. | |
| 6,307,526 B1 | 10/2001 | Mann | |
| 6,311,837 B1 | 11/2001 | Blaustein et al. | |
| 6,320,822 B1 | 11/2001 | Okeya et al. | |
| 6,325,521 B1 | 12/2001 | Gregg et al. | |
| 6,328,454 B1 | 12/2001 | Davis | |
| 6,340,234 B1 | 1/2002 | Brown, Jr. | |
| 6,345,716 B1 | 2/2002 | Chapman | |
| 6,347,410 B1 | 2/2002 | Lee | |
| 6,363,537 B1 | 4/2002 | Park | |
| 6,366,344 B1 | 4/2002 | Lach | |
| 6,382,407 B1 | 5/2002 | Chao | |
| 6,386,701 B1 | 5/2002 | Khulusi | |
| 6,390,640 B1 | 5/2002 | Wong et al. | |
| 6,398,386 B1 | 6/2002 | Huang | |
| 6,416,199 B1 | 7/2002 | Heine | |
| 6,431,904 B1 | 8/2002 | Berelsman | |
| 6,442,764 B1 | 9/2002 | Badillo et al. | |
| 6,457,838 B1 | 10/2002 | Dugmore et al. | |
| 6,461,015 B1 | 10/2002 | Welch | |
| 6,461,025 B1 | 10/2002 | Payne | |
| 6,474,830 B1 | 11/2002 | Hansen | |
| 6,476,391 B1 * | 11/2002 | Zhang | 250/330 |
| 6,497,493 B1 | 12/2002 | Theisen | |
| 6,504,099 B2 | 1/2003 | Huang | |
| 6,549,231 B1 | 4/2003 | Matsui | |
| 6,553,570 B1 | 4/2003 | Flynn | |
| 6,578,982 B1 | 6/2003 | Lynch | |
| 6,598,991 B2 | 7/2003 | Altman | |
| 6,604,837 B2 | 8/2003 | Sandberg | |
| 6,616,293 B2 | 9/2003 | Mickey | |
| 6,659,618 B2 | 12/2003 | Waters | |
| 6,679,615 B2 | 1/2004 | Spearing | |
| 6,704,044 B1 * | 3/2004 | Foster et al. | 348/157 |
| 6,709,142 B2 | 3/2004 | Gyori | |
| 6,713,956 B2 | 3/2004 | Hsing Chen et al. | |
| 6,715,309 B1 | 4/2004 | Junkins | |
| 6,719,437 B2 | 4/2004 | Lary et al. | |
| 6,721,962 B1 | 4/2004 | Polaire | |
| D489,165 S | 5/2004 | Waters | |
| 6,733,150 B1 | 5/2004 | Hanley | |
| 6,760,925 B1 | 7/2004 | Maxwell | |
| 6,802,636 B1 | 10/2004 | Bailey, Jr. | |
| 6,811,441 B2 | 11/2004 | Simpson | |
| 6,817,711 B2 | 11/2004 | Schubert | |
| 6,830,357 B2 | 12/2004 | Lopez | |
| 6,837,590 B2 | 1/2005 | Marston | |
| 6,860,628 B2 | 3/2005 | Robertson et al. | |
| 6,865,285 B1 | 3/2005 | Villa-Aleman | |
| 6,908,208 B1 | 6/2005 | Hyde et al. | |
| 6,923,322 B2 | 8/2005 | Lenker | |
| 6,929,375 B2 * | 8/2005 | Satomi | 362/11 |
| 6,932,216 B2 | 8/2005 | Blaustein et al. | |
| 6,935,761 B2 | 8/2005 | Vanderschuit | |
| 6,941,583 B2 | 9/2005 | Yan | |
| 6,966,668 B2 | 11/2005 | Cugini et al. | |
| 6,969,178 B2 | 11/2005 | Zuloff | |
| 6,977,776 B2 | 12/2005 | Volkenandt et al. | |
| 6,993,803 B2 | 2/2006 | Chan | |
| 6,994,445 B1 | 2/2006 | Pomes | |
| 7,000,841 B2 | 2/2006 | Becker | |
| 7,003,353 B1 | 2/2006 | Parkhouse | |
| 7,004,439 B1 | 2/2006 | Taylor et al. | |
| 7,021,790 B2 | 4/2006 | Parsons | |
| D520,460 S | 5/2006 | Wadsworth et al. | |
| 7,052,154 B2 | 5/2006 | Vanderschuit | |
| 7,086,749 B1 | 8/2006 | Hanley | |
| 7,094,981 B2 | 8/2006 | Sorrentino et al. | |
| 7,105,939 B2 | 9/2006 | Bednyak | |
| 7,111,956 B2 * | 9/2006 | Brown | 362/106 |
| 7,118,241 B2 | 10/2006 | Sohn | |
| 7,118,262 B2 | 10/2006 | Negley | |
| 7,128,434 B1 | 10/2006 | Nally et al. | |
| 7,147,338 B2 | 12/2006 | Gregg | |
| 7,163,309 B2 | 1/2007 | Sohn | |
| 7,182,478 B2 | 2/2007 | Marston | |
| 7,186,159 B1 * | 3/2007 | Baxter | 441/124 |
| 7,192,151 B2 | 3/2007 | Clupper et al. | |
| 7,209,652 B2 * | 4/2007 | Uenaka | 396/182 |
| 7,234,831 B1 | 6/2007 | Hanley | |
| D566,044 S | 4/2008 | D'Arco et al. | |
| 7,369,174 B2 * | 5/2008 | Olita et al. | 348/373 |
| 7,431,472 B2 * | 10/2008 | Becker | 362/106 |
| 7,457,536 B2 * | 11/2008 | Hamada et al. | 396/182 |
| 7,461,764 B2 | 12/2008 | Thompson | |
| 7,470,022 B2 | 12/2008 | Lerner | |
| D591,675 S | 5/2009 | Waters | |
| 7,576,800 B2 * | 8/2009 | Swain | 348/376 |
| D600,208 S | 9/2009 | Waters | |
| 7,598,928 B1 * | 10/2009 | Buskop | 345/8 |
| 7,609,295 B2 | 10/2009 | Aridome et al. | |
| 7,611,255 B1 * | 11/2009 | Lagassey | 362/103 |
| 7,661,818 B2 | 2/2010 | Waters | |
| 7,677,751 B2 | 3/2010 | Kinsman et al. | |
| 7,753,547 B2 | 7/2010 | Waters | |
| 7,784,960 B2 * | 8/2010 | Lahtinen | 362/105 |
| 2001/0024365 A1 | 9/2001 | Aknine | |
| 2002/0131275 A1 | 9/2002 | Yamamoto et al. | |
| 2002/0159250 A1 | 10/2002 | Kuo et al. | |
| 2002/0163800 A1 | 11/2002 | Hansen | |
| 2002/0186557 A1 | 12/2002 | Lary et al. | |
| 2002/0187806 A1 | 12/2002 | Jang | |
| 2003/0079387 A1 | 5/2003 | Derose | |
| 2003/0106918 A1 * | 6/2003 | Hung | 224/222 |
| 2003/0122958 A1 | 7/2003 | Olita et al. | |
| 2003/0151910 A1 | 8/2003 | Marston | |
| 2003/0169207 A1 | 9/2003 | Beigel | |
| 2003/0231489 A1 | 12/2003 | Hsiao | |
| 2004/0001150 A1 * | 1/2004 | Schindler et al. | 348/220.1 |

(56) References Cited

U.S. PATENT DOCUMENTS

| | | | |
|---|---|---|---|
| 2004/0008157 A1* | 1/2004 | Brubaker et al. | 345/8 |
| 2004/0085745 A1* | 5/2004 | Yoshihara | 362/8 |
| 2004/0141312 A1 | 7/2004 | Henning et al. | |
| 2004/0165109 A1* | 8/2004 | Lee | 348/375 |
| 2004/0222638 A1 | 11/2004 | Bednyak | |
| 2004/0240067 A1 | 12/2004 | Marusi et al. | |
| 2004/0240204 A1 | 12/2004 | Russ et al. | |
| 2004/0264176 A1 | 12/2004 | Vanderschuit | |
| 2005/0001433 A1 | 1/2005 | Seelin | |
| 2005/0047116 A1 | 3/2005 | Gagne | |
| 2005/0066422 A1 | 3/2005 | Yan | |
| 2005/0072458 A1 | 4/2005 | Goldstein | |
| 2005/0078473 A1 | 4/2005 | Zuloff | |
| 2005/0083676 A1 | 4/2005 | VanderSchuit | |
| 2005/0099799 A1 | 5/2005 | Cugini et al. | |
| 2005/0105285 A1 | 5/2005 | Maden | |
| 2005/0161313 A1 | 7/2005 | Sorrentino et al. | |
| 2005/0174753 A1 | 8/2005 | Cao et al. | |
| 2005/0204490 A1 | 9/2005 | Kemp et al. | |
| 2005/0211187 A1 | 9/2005 | Harman et al. | |
| 2005/0211574 A1 | 9/2005 | Reeve | |
| 2005/0213340 A1 | 9/2005 | Suzuki et al. | |
| 2005/0219837 A1 | 10/2005 | Brown | |
| 2005/0265015 A1 | 12/2005 | Salazar | |
| 2006/0037125 A1 | 2/2006 | McDowell | |
| 2006/0091784 A1 | 5/2006 | Connor et al. | |
| 2006/0092621 A1 | 5/2006 | Lai | |
| 2006/0107952 A1 | 5/2006 | Schlosser | |
| 2006/0125624 A1 | 6/2006 | Ostrovsky et al. | |
| 2006/0126323 A1 | 6/2006 | Pomes | |
| 2006/0138440 A1 | 6/2006 | Jyo | |
| 2006/0141828 A1 | 6/2006 | Dean et al. | |
| 2006/0157569 A1 | 7/2006 | Becker | |
| 2006/0158895 A1 | 7/2006 | Brands et al. | |
| 2006/0165160 A1* | 7/2006 | Winningstad et al. | 375/219 |
| 2006/0198122 A1 | 9/2006 | Senter et al. | |
| 2006/0215393 A1 | 9/2006 | VanderSchuit | |
| 2006/0232955 A1 | 10/2006 | Labine | |
| 2006/0239018 A1 | 10/2006 | Jardin | |
| 2006/0263677 A1 | 11/2006 | Tsai | |
| 2006/0285315 A1 | 12/2006 | Tufenkjian | |
| 2006/0286443 A1 | 12/2006 | Huang | |
| 2006/0291193 A1 | 12/2006 | Hill | |
| 2007/0003826 A1 | 1/2007 | Hsu | |
| 2007/0048598 A1 | 3/2007 | Huang | |
| 2007/0053179 A1 | 3/2007 | Pang et al. | |
| 2007/0058361 A1 | 3/2007 | Sevilla | |
| 2007/0064413 A1 | 3/2007 | Slater | |
| 2007/0072655 A1 | 3/2007 | Cascone | |
| 2007/0074752 A1 | 4/2007 | Shau et al. | |
| 2007/0097668 A1 | 5/2007 | Choi | |
| 2007/0140675 A1 | 6/2007 | Yanagi | |
| 2007/0145746 A1 | 6/2007 | Biamonte | |
| 2007/0153537 A1 | 7/2007 | Scott et al. | |
| 2007/0159810 A1 | 7/2007 | Kim | |
| 2007/0159823 A1 | 7/2007 | Ho et al. | |
| 2007/0171628 A1 | 7/2007 | Seade | |
| 2007/0189003 A1 | 8/2007 | Daley | |
| 2007/0206373 A1 | 9/2007 | Whiteside et al. | |
| 2007/0236915 A1 | 10/2007 | Chen | |
| 2007/0236916 A1 | 10/2007 | Hsu | |
| 2008/0130272 A1 | 6/2008 | Waters | |
| 2008/0263750 A1 | 10/2008 | Chen et al. | |
| 2008/0266839 A1* | 10/2008 | Claypool et al. | 362/106 |
| 2009/0147503 A1 | 6/2009 | Bennett | |
| 2009/0148149 A1 | 6/2009 | Chishima | |
| 2009/0193566 A1 | 8/2009 | Waters | |
| 2010/0214767 A1 | 8/2010 | Waters | |
| 2010/0307931 A1 | 12/2010 | Waters | |
| 2010/0313335 A1 | 12/2010 | Waters | |
| 2011/0122601 A1 | 5/2011 | Waters | |
| 2011/0210685 A1 | 9/2011 | Liao | |

FOREIGN PATENT DOCUMENTS

| | | |
|---|---|---|
| AU | 199940150 | 2/2000 |
| AU | 199959545 | 3/2000 |
| AU | 2002100976 | 6/2003 |
| AU | 2003100277 | 7/2003 |
| AU | 2003248016 | 11/2004 |
| CA | 2029772 | 5/1991 |
| CA | 2198625 | 2/1997 |
| CA | 2184336 | 5/1997 |
| CA | 2406450 | 11/2001 |
| CA | 2466175 | 5/2003 |
| CN | 86208973 | 10/1987 |
| CN | 2173427 | 8/1994 |
| CN | 2239167 | 11/1996 |
| CN | 2423761 | 3/2001 |
| CN | 2433836 | 6/2001 |
| CN | 2458892 | 11/2001 |
| CN | 2508592 | 9/2002 |
| CN | 2544551 | 4/2003 |
| CN | 1462597 | 12/2003 |
| CN | 1603677 | 4/2005 |
| DE | 8230583 | 9/1983 |
| DE | 29808222 | 11/1998 |
| DE | 19837151 | 4/2000 |
| DE | 20007738 | 9/2000 |
| DE | 29915607 | 9/2000 |
| DE | 20017922 | 2/2001 |
| DE | 20020515 | 8/2001 |
| DE | 20101380 | 8/2001 |
| DE | 20106261 | 9/2001 |
| DE | 20111815 | 11/2001 |
| DE | 10046295 | 3/2002 |
| DE | 20117740 | 4/2002 |
| DE | 20201557 | 5/2002 |
| DE | 20200058 | 6/2002 |
| DE | 10103591 | 8/2002 |
| DE | 20110124 | 8/2002 |
| DE | 10057388 | 9/2002 |
| DE | 20209115 | 10/2002 |
| DE | 20210806 | 10/2002 |
| DE | 10216152 | 12/2002 |
| DE | 20209611 | 1/2003 |
| DE | 20313629 | 12/2003 |
| DE | 10330589 | 1/2004 |
| DE | 20319297 | 2/2004 |
| DE | 20318860 | 4/2004 |
| DE | 20318949 | 4/2004 |
| DE | 202004004960 | 9/2005 |
| EP | 1072204 | 1/2001 |
| EP | 1374707 | 1/2004 |
| FR | 1221782 | 6/1960 |
| FR | 2798721 | 3/2001 |
| FR | 2824709 | 11/2002 |
| FR | 2829365 | 3/2003 |
| FR | 2833068 | 6/2003 |
| FR | 2833069 | 6/2003 |
| GB | 2268043 | 1/1994 |
| GB | 2316293 | 2/1998 |
| GB | 2358575 | 8/2001 |
| GB | 2363314 | 12/2001 |
| GB | 2374401 | 10/2002 |
| GB | 2378117 | 2/2003 |
| GB | 2378118 | 2/2003 |
| GB | 2388298 | 11/2003 |
| JP | S61-006304 | 1/1986 |
| JP | 4289602 | 10/1992 |
| JP | H08-027610 A | 1/1996 |
| JP | H08-298004 A | 11/1996 |
| JP | H09-209210 A | 8/1997 |
| JP | H09-296319 A | 11/1997 |
| JP | H10-081275 A | 3/1998 |
| JP | H10-331019 A | 12/1998 |
| JP | 3084061 | 11/2001 |
| JP | 2004-207580 | 7/2004 |
| JP | 2005-216832 A | 8/2005 |
| JP | 2006-097156 A | 4/2006 |
| KR | 20-0164075 | 2/2000 |
| KR | 200168826 | 2/2000 |

(56) References Cited

FOREIGN PATENT DOCUMENTS

| KR | 200260980 | 1/2002 |
|----|-----------|--------|
| KR | 20020065405 | 8/2002 |
| KR | 200331201 | 10/2003 |
| TW | 241462 | 2/1995 |
| TW | 275188 | 5/1996 |
| TW | 286489 | 9/1996 |
| TW | 324234 | 1/1998 |
| TW | 329607 | 4/1998 |
| TW | 386364 | 4/2000 |
| WO | 94/02043 | 2/1994 |
| WO | 97/04434 | 2/1997 |
| WO | 02/44611 | 6/2002 |
| WO | 02/062165 | 8/2002 |
| WO | 02/074398 | 9/2002 |
| WO | 02/077520 | 10/2002 |
| WO | 03/040808 | 5/2003 |
| WO | 03/047377 | 6/2003 |
| WO | 03/083811 | 10/2003 |
| WO | 2004/000054 | 12/2003 |
| WO | 2004/064555 | 5/2004 |
| WO | 2004/103104 | 12/2004 |
| WO | 2005/002378 | 1/2005 |
| WO | 2005/005882 | 1/2005 |
| WO | 2005/038337 | 4/2005 |
| WO | 2005/096856 | 10/2005 |
| WO | 2005/098314 | 10/2005 |
| WO | 2006/037845 | 4/2006 |
| WO | 2006/124928 | 11/2006 |
| WO | 2007/073047 | 6/2007 |
| WO | 2007/073219 | 6/2007 |
| WO | 2007/089236 | 8/2007 |
| WO | 2007/093348 | 8/2007 |
| WO | 2007/112338 | 10/2007 |
| WO | 2008/011750 | 1/2008 |
| WO | 2009/079656 | 6/2009 |
| WO | 2010/099504 | 9/2010 |

OTHER PUBLICATIONS

Docket report of *Waters Industries, Inc. v. Totes Isotoner Corporation, et al.*, United States District Court for the Northern District of Illinois, Case No. 1:10-cv-04487 filed Jul. 19, 2010 (4 pages).

"Complaint", *Waters Industries, Inc. v. Totes Isotoner Corporation, et al.*, United States District Court for the Northern District of Illinois, Case No. 1:10-cv-04487 (Docket No. 1, Jul. 19, 2010) (26 pages).

Written Opinion of the International Searching Authority and International Search Report from the International Bureau of WIPO for International Application No. PCT/US2006/018968, dated Oct. 16, 2006, 12 pages.

Notification of Transmittal of the International Search Report and the Written Opinion of the International Searching Authority, or the Declaration from the International Bureau of WIPO for International Application No. PCT/US2008/087542 dated May 4, 2009, 12 pages.

Notification of Transmittal of the International Search Report and the Written Opinion of the International Searching Authority, or the Declaration from the International Bureau of WIPO for International Application No. PCT/US2010/025689 dated May 4, 2010, 14 pages.

Notification of Transmittal of the International Search Report and the Written Opinion of the International Searching Authority, or the Declaration from the International Bureau of WIPO for International Application No. PCT/US2011/034686 dated Aug. 1, 2011, 16 pages.

\* cited by examiner

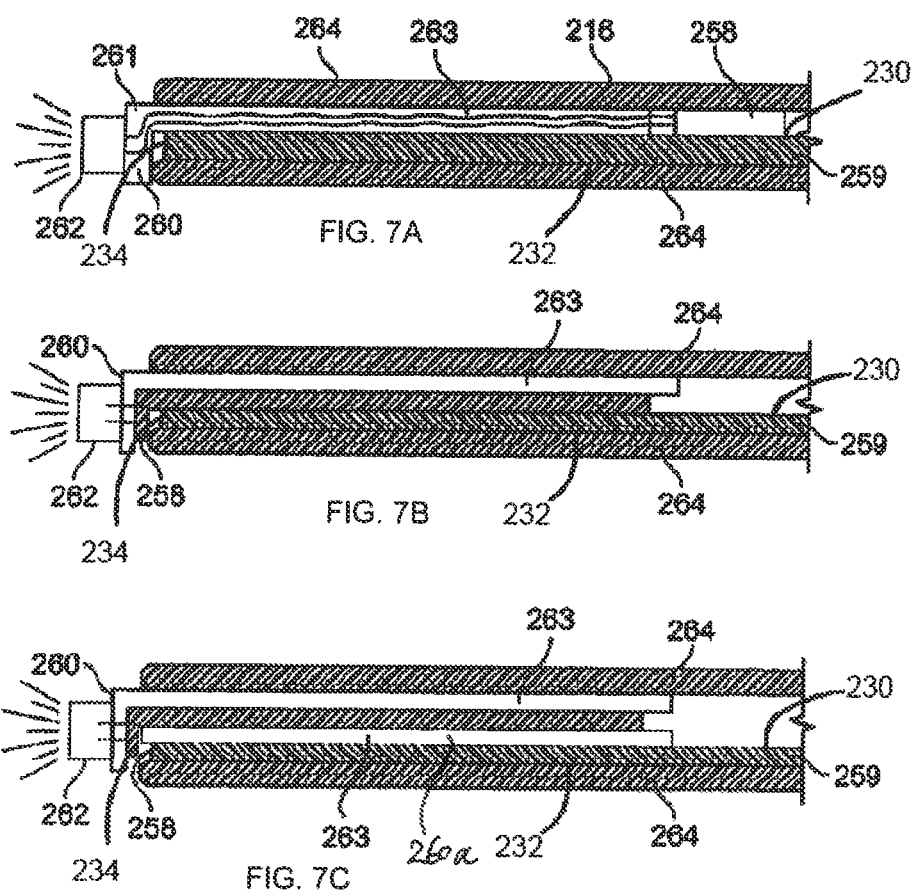
FIG. 7A
FIG. 7B
FIG. 7C
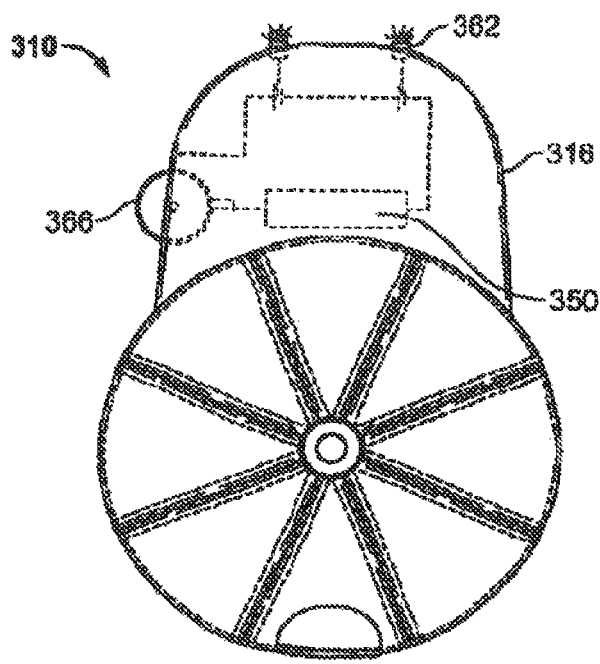
FIG. 8

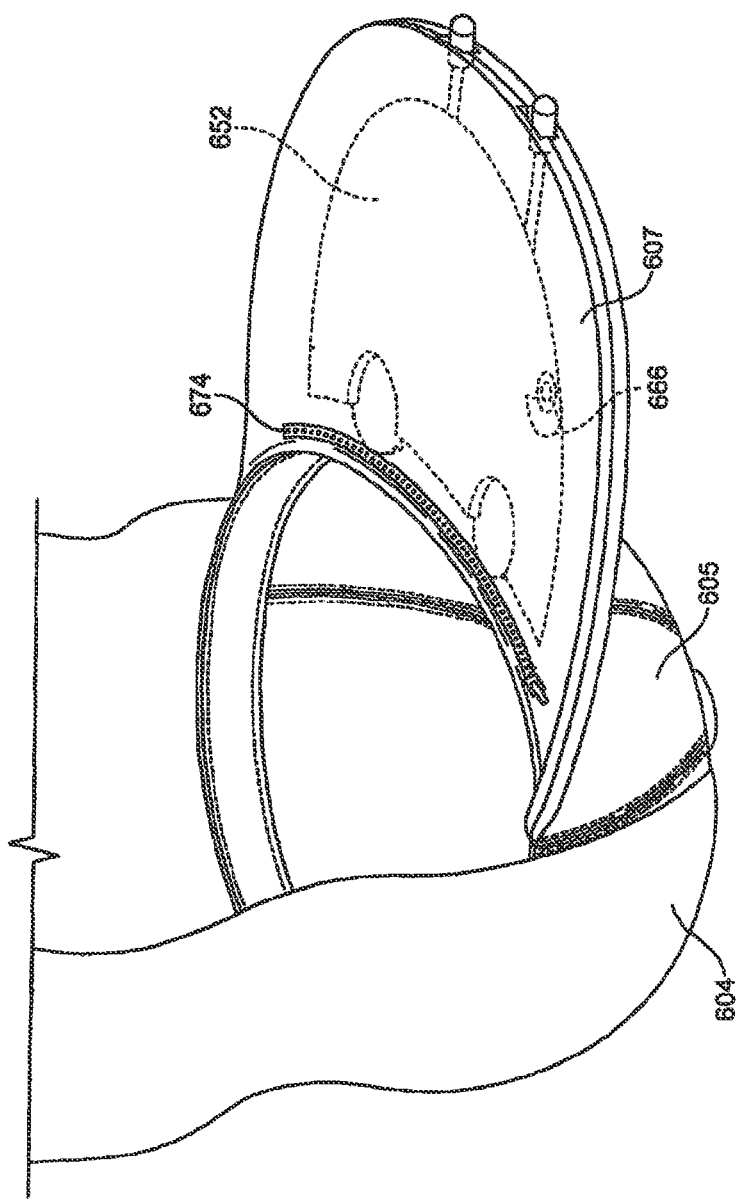

HEADGEAR HAVING AN ELECTRICAL DEVICE AND POWER SOURCE MOUNTED THERETO

CROSS-REFERENCE TO RELATED APPLICATION

This application is a continuation-in-part of International Application No. PCT/US2008/087542, filed Dec. 18, 2008, which claims the benefit of U.S. Provisional Application No. 61/014,726, filed Dec. 18, 2007, which are hereby incorporated by reference herein in their entirety. This application also claims the benefit of U.S. Provisional Application No. 61/330,185, filed Apr. 30, 2010, which is hereby incorporated by reference herein in its entirety.

FIELD OF THE INVENTION

The field relates to hands-free lighting devices and, in particular, to lighted hats, lighted clothing items, and other accessories and components associated with hands-free lighting devices.

BACKGROUND OF THE INVENTION

Often an individual desires a light focused to illuminate an area while performing a task or a light directed in a general outward direction for visibility. Holding a flashlight is an option, but such lighting devices are often cumbersome and may detract from the task being completed because the flashlight needs to be hand-held to be able to direct the light at a work site where the user needs illumination. As a result, hands-free lighting is often used because the individual desiring illumination does not need to hold the light source.

Lighted headgear may include illumination sources mounted to various types of headgear and hats. The light can be directed in such a manner so that the wearer is illuminated to be seen by others or directed downward to provide light forwardly of the wearer illuminating an area in the wearer's field of view, such as for reading. Applicant's U.S. Pat. No. 6,659,618 provides examples of such lighted hats. The light source can be one or more LEDs. Such LED lighted headgear, which may include LEDs mounted to a typical baseball-style cap, are convenient for hands-free lighting in a number of recreational activities, such as camping, hunting, fishing, jogging, or the like. Lighted headgear may include separate components such as one housing or assembly to hold a power source and other electrical components and a separate housing or assembly to contain the illumination source. Other lighted hats may contain all electrical components within a crown and/or brim portion of the hat. In each case, the lighted headgear generally includes a user-activated power switch (to energize the light source) positioned on one of the housings or on a portion of the hat.

In many cases, the lighted headgear is displayed on a store shelf in a manner so that a potential purchaser can operate the switch to turn on the light source. To this end, the hat may be provided to the store with a power source already included so that the light source can be activated by the consumer. However, because the lighted headgear may be shipped in bulk to the store with the power source included, the power source can be unintentionally activated through contact of the activation switch with an adjacently packed hat. In particular, where the activation switch is positioned on the hat brim, the light source can be inadvertently turned on during the shipping process by the hat brim of one hat engaging or depressing the activation switch of another hat nested therewith. Such inadvertent activation can drain the power source prior to the hat's display on the store shelf.

Prior packaging arrangements have been configured to allow actuation of a switch to momentarily activate a power source while an item is encased with the packaging, but such prior packaging is generally a blister-type pack that completely encases the product so that it tends to be bulky and distracts from the appearance of the item within the package. Moreover, such prior blister-pack arrangements generally do not include sufficient structure on the packaging to block inadvertent actuation of the switch that might cause power to drain from the battery. Therefore, when these prior packaging designs are shipped in bulk, there is the risk that engagement between adjacent packages could energize the power source and drain the battery.

For example, U.S. Pat. No. 6,311,837 to Blaustein provides a bulky blister pak for an electric toothbrush that allows momentary activation of the toothbrush while within the packaging material by permitting a power switch to be depressed momentarily, but attempts to block continuous actuation of the power source by hindering the sliding of the switch to a permanently on position. To this end, Blaustein permits the momentary depressing of its power switch by relying on the flexibility of the blister pak material covering the switch that can easily deform to allow the switch to be depressed, but then includes a single and narrow rib adjacent one side of the momentary switch to prevent the sliding action of the switch to the continuously on position.

Blaustein's single rib is designed primarily to block the activation switch from shifting or sliding in a direction along the shaft of the toothbrush to prevent the switch from being shifted to the continuous on position. Although this packaging arrangement may be effective to prevent the switch from being slid to the continuously on-position, the blister pak has a relatively flexible material surrounding the switch in order to permit the momentary actuation of the switch. Therefore, inadvertent actuation may still occur when multiple items having this packaging arrangement are stacked atop one another. When sufficient items are tightly packed in a box or other shipping crate, a force between packed items may be sufficient to deform of the thin blister pak material covering the switch to depress the switch to the momentary on position. Therefore, Blaustein's switch can be inadvertently depressed to the momentary on position and the power source drained.

Other accessories have also been mounted to headgear to generally enable some aspect of hands-free operation of such accessories. In this regard, the individual's hands are free to complete other tasks while the accessory is being used. For example, cameras, binoculars, as well as other accessories have been mounted to headgear in order to allow the use of the accessory generally without requiring the use of ones hands. However, prior hat and accessory configurations tend to be bulky and also detract from the traditional style of the headgear.

In some instances, the lighted headgear may contain illumination sources, such as powerful LEDs, that release relatively large quantities of heat during operation. In order to protect the components of such an LED lighting system it is advantageous to dissipate the heat generated during light operation. Unfortunately, current heat sinks configured for use with compact light sources such as LEDs tend to be large and bulky and require relatively large flat surfaces to which the heat sink is mounted. In addition, prior heat sinks and LED configurations tend to be relatively thick and rigid which can limit their positioning on some headgear designs, such as baseball type hats or caps. Therefore, mounting a heat sink to an LED on a lighted hat tends to increase the thickness and bulk of the profile of the hat, and particularly the brim thereof from its normal more desired appearance.

Lighted headgear may include activation switches that are operable to establish electrical communication between the power source and the illumination source. The illumination source can be energized once the activation switch is depressed, slid, or otherwise shifted to an on position. For example, it is known to place a push button switch underneath the fabric covering the rigid brim material. However, many activation switches tend to be large and bulky and they do not allow the hat to maintain its normal more desired appearance because the switch provides bulges or other bumps in the profile of the hat.

Other headgear configurations include a power source contained in a rigid battery holder. In some cases, such rigid holder is placed within a lower sweatband area of the crown portion of the headgear that encircles a wearer's head. Because of the rigid configuration of the battery holder, the headgear can be uncomfortable for the wearer because the battery holder generally does not conform to the curved shape of the headgear. Alternatively, loose batteries can be placed in a pouch or other pocket contained within the headgear, but such loose configuration of the batteries can place strain on the wire connection to the battery that can eventually fail after repeated use of the hat due to repeated bending of the connection.

SUMMARY OF THE INVENTION

There is provided hands-free lighting, components thereof, and other accessories combined with the hands-free lighting. The hands-free lighting is preferably lighted headgear including hats or lighted clothing items. The hands-free lighting may also include various accessories for use therewith, such as a camera mounted to the headgear with a flash configured to reduce the effects of red eye, different configurations to dissipate heat generated from a high powered light source, switches that are concealed within the headgear to maintain the normal appearance of the hat, protective guards for an activation switch to prevent inadvertent activation thereof, and a relatively flexible battery module configured to power the lighted hat while maintaining its natural and streamlined appearance.

In one aspect, the lighted headgear is a lighted baseball-type hat where a plurality of LEDs are mounted on a brim thereof to provide outward illumination to at least two different distances from the hat. In one form, the LEDs are configured to project outward illumination to the different distances by using LEDs having two different predetermined light cones. In such form, one LED has a wider light cone for providing illumination at closer working distances to the hat while another LED has a narrower light cone for providing illumination at working distances further away from the hat. In another form, the LEDs can be mounted on the brim and disposed to provide outward illumination at varying angles. In this form, one or more LEDs can be mounted to direct illumination substantially parallel to the brim for providing illumination to areas that are at distances far away from the hat, and another LED can be mounted inclined to the brim to project illumination close to the hat. Such LED lighted hats provide for directed illumination either close working distances, such as a reading distance of about 24 to 30 inches in front of a wearer or a working distance much farther from the wearer without the need of a dimmer switch. To this end, the lighted hats herein also provide for illumination close to and far away from the wearer having generally the same intensity of light where the prior hats using dimmer switches have varying intensity depending on the position of the dimmer switch.

In another aspect, the lighted headgear includes a camera accessory mounted to the brim. In one form, the camera accessory can be configured so that the user can operate the camera while keeping their hands free to perform other tasks. The lighted headgear/camera accessory also includes one or more LEDs mounted along the brim at a predetermined distance from the camera and synchronized to energize with the camera to provide a flash for the camera. In order to eliminate the red eye effects that commonly occur when a photograph is taken, the LEDs are preferably mounted a predetermined distance is that relatively far away from a lens of the camera such as positioned on the outside edges of the hat brim at the arcuate portions of the hat brim. By one approach, the LEDs are mounted on opposite sides of the hat brim while the camera lens is mounted centrally on the brim. By positioning the LEDs on the edge of the hat brim with the camera lens centrally positioned on the brim, the effects of red eye can be minimized.

By another approach, the headgear with the camera accessory can further include a control panel. The control panel is disposed on the brim to provide controls for operation and use of the camera. For example, the control panel can include a switch to send control signals to the camera, a switch having different conditions for various operational states of the camera, a connection device to download images or pictures and/or video generated by the camera and charge a power source mounted to the headgear, a status indicator, or the like. The control panel can further include a circuit board in combination with the above components.

In another form, the lighted headgear/camera combination can also include a camera viewfinder that is in electrical communication with a lens of the camera to provide an image from the camera lens. Preferably, the viewfinder is pivotally mounted on an underside of the hat brim so that when the camera is not in use it can be rotated along a pivot axis adjacent to or flush with the under side of the brim. When in use, the viewfinder can be pivoted downwardly in the wearer's line of sight so the wearer can aim the camera and view an image of what the camera lens is focused on.

In another aspect, the lighted headgear includes a relatively thin and flexible heat sink in combination with a flexible circuit board. In one form, the heat sink and circuit board combination is preferably configured to be used with a surface mount LED, mounted to an outboard edge of the hat brim. The relatively thin and flexible heat sink is a thermally conductive material that is in contact with the light source in order to dissipate the heat that is generated by operation of the light source. The relatively thin and flexible heat sink provides advantages over the large and thick prior heat sinks because it can conform to the curvature of the hat brim and/or be bent over an edge of the brim in order to be in direct contact with a surface mount LED mounted to the brim edge and still provide heat dissipation at the same time. Preferably, the flexible circuit board is in electrical communication with a power source and the light source and can be disposed on the brim of the hat and connected to the relatively thin and flexible heat sink in a way that reduces the profile of the lighted hat. In a preferable form, both the circuit board and heat sink are bent over the outboard edge of the hat brim. In this regard, both the heat sink and circuit board can be directly in engagement with the LED on the brim outboard edge, which avoids wiring other connections therebetween simplifying assembly of the hat.

In yet another aspect, the lighted headgear has a rotary switch located along a brim edge and positioned between upper and lower portions of the brim fabric used to cover the brim. Preferably, the rotary switch is disposed on the hat in a manner that maintains the natural streamlined appearance of the brim. The rotary switch can be configured to energize, de-energize, or change the illumination intensity of the light source by turning the switch about its rotary axis. The rotary switch can further be configured to changes modes of the lighted headgear. By one approach, the rotary switch can include a push button mechanism so that the switch can be turned and pushed and depressed.

In another aspect, the lighted headgear can be in the form of a sweatshirt or another garment that includes a hood portion and a hat portion with a brim. Preferably, the brim includes a light source, a power source, and an activation switch all incorporated in a single removable module. The hat portion can be fixed to the hood portion or the hat portion and/or the brim can be removably mounted to the hood portion via a mount mechanism. By one approach, an attachment mechanism between the hat portion and the hood portion can be a zipper, Velcro, snaps, magnets, buttons, pins, adhesives, and other fasteners that provide a detachable connection between the hat and hood portions. By having the electrical components on a removable module or removable hat portion, the electrical components can be removed for washing of the hood portion of the garment.

In yet another aspect, the lighted headgear includes a relatively flexible battery module or holder that includes at least one battery receptacle and a flexible portion for electrical wiring that is electrically connected to a battery held in the receptacle therefor. The battery module is disposed toward the side or back of the lighted hat in a manner that allows the hat to maintain its natural appearance without unsightly projections or bulges due to components of the lighting system mounted therein. Preferably, the flexible portion of the battery holder is a base portion having at least one elongate flexible portion to allow the module to conform to the curvature of the hat and at least one more rigid portion to provide stress relief at an electrical connection between the battery connections and the electrical wiring thereto. In a preferred form, the base portion is overmolded with resilient materials onto the receptacle so that the flexible and more rigid portions are one integral molded piece. The flexible portion is provided with greater flexibility than the rigid portion at which the wires connect to the battery by cut-outs formed in the annular body of the flexible portion. The battery holder, therefore, permits the module to bend in order to conform to the curvature of the hat via the flexible portion but, at the same time, has rigid sections to provide protection to the electrical connection between the battery and the wiring.

In yet another aspect, the lighted headgear includes a removable brim sleeve that may be mounted to a brim portion of the lighted headgear so as to provide protection against inadvertent actuation of a light switch associated with the lighted headgear. Preferably, the brim sleeve will include a thin cardboard, paperboard, or other fiberboard packaging cover or body capable of being detachably mounted to a brim of the lighted headgear. An upper portion of the brim sleeve body is configured to extend across and substantially cover a top portion of the lighted hat brim and is connected to at least one lower portion of the brim sleeve body, which is configured to extend along a bottom surface of the lighted hat brim between opposite brim side edges thereof. Such a configuration provides a packaging cover that forms a sleeve about the brim that generally conforms to the upper and lower brim surfaces so as to maintain a thin profile having a curvature similar to that of the brim surfaces. This configuration of the brim sleeve provides a packaging surface for indicia or other cap identification, but is not bulky and generally does not distract from the hat's appearance because it configured to conform to the curvature of the upper and lower brim surfaces. In addition, such compact and conforming configuration of the brim sleeve relative to the hat brim also enables a consumer to try on the hat in the store because the brim sleeve does not interfere with the crown or other head wrapping portion of the hat.

The lighted headgear also includes an actuation switch used to actuate the light source on the lighted headgear. The actuation switch may include a variety of forms and be positioned in a variety of locations on the hat. In one example, the actuation switch is disposed on the lower brim surface and has a button or plunger actuator extending away from the brim surface that is configured to be depressable toward the brim such that the light source may be actuated to an "on" or "off" state by depressing the button or plunger actuator towards the brim. A user may depress the button or plunger actuator to actuate the lighted headgear to its on-state, which may include a number of alternative lighting modes (blinking, colors, varying number of light sources energized, etc.) selected by repeatedly depressing the button to select the modes of the on-state. The light source will remain in the on-state (or selected lighting mode) until the user again depresses the plunger actuator causing the switch to configure the lighted headgear to an off-state.

The brim sleeve may also include a protection or switch guard adjacent to or extending around the actuation switch. For example, at least one lower portion of the brim sleeve body may have the switch guard associated therewith that is configured to extend about the actuation switch so as to avoid inadvertent actuation thereof. The switch guard may be a portion of the cardboard body or be a separate plastic piece mounted to the cardboard or paperboard portion of the brim sleeve via a mounting flange and a mating surface. In a preferred form, the switch guard is a molded plastic material having an upstanding flange or wall portion that, when mounted to the hat brim, extends away from the brim surface beyond the plunger actuator to serve as a barrier for avoiding unintentional actuation of the actuation switch. The upstanding flange or wall portion may generally encircle the activation switch, but still has an access opening associated with the button or plunger actuator thereby providing direct and intentional access to the switch. In one form, the actuation switch is a push button switch, which may be provided in the form of the rotary switch, as described above.

Many lighted hats may be manufactured at the same facility and transported from the facility to a retail store for consumer purchasing in a shipping box or other crate. A convenient way to transport such lighted hats is to place a plurality of lighted hats in a nested configuration where the individual hats within the plurality of lighted hats stack atop one another such that a crown of a lower lighted hat is inserted into a crown of an upper lighted hat while a brim of the lower lighted hat overlaps at least a portion of a brim of the upper lighted hat. This nested configuration allows for convenient and efficient transportation of the plurality of lighted hats. In order to prevent inadvertent actuation of an activation switch associated with any of the individual hats within the plurality of lighted hats, an insert spacer device is provided that is positioned between the nested brims of adjacent hats. For example, the insert spacer device may be positioned between the brim upper surface of the lower hat and the brim lower surface of the upper hat. The spacer device is then arranged and configured to maintain a space between the two hat brims so that the switch on the lower surface of the upper hat remains spaced from the upper brim surface of the lower hat when the hats are in a nested arrangement.

In one form, the insert spacer device may include the above described brim sleeve and switch guard to prevent the inadvertent actuation of the corresponding activation switches associated with each of the individual hats when in the nested arrangement. In particular, each hat will include an associated brim sleeve surrounding its brim with the associated switch guard extending about its activation switch. These switch guards will also preferably have an upstanding flange or wall portion that encircles the activation switch to avoid inadvertent actuation of the activation switch by any of the other individual hats within the plurality of lighted hats in the nested configuration.

BRIEF DESCRIPTION OF THE DRAWINGS

FIG. 7A is a cross-sectional view of the brim of a baseball hat showing an LED mounted on the relatively thin and flexible heat sink and the flexible printed circuit board spaced from the heat sink;

FIG. 7B is a cross-sectional view of the brim of a baseball hat showing an LED mounted on the relatively thin and flexible heat sink with the flexible printed circuit board and heat sink sandwiched between fabric material of the brim covering the hat brim;

FIG. 7C is a cross-sectional view of the brim of the a baseball hat showing an LED mounted on the relatively thin and flexible heat sink and a second heat sink with the flexible printed circuit board sandwiched therebetween with the heat sinks and the circuit board between fabric material of the brim covering the hat brim;

FIG. 8 is a plan view of a lighted baseball cap showing a rotary activation switch that is operable to establish electrical communication between a power source and LEDs configured to provide illumination outward away from the hat;

FIG. 23 is a perspective view of a self-contained lighted brim similar to FIG. 21 showing the removable light module in the brim and which is in phantom accessible through a zipper opening in the brim fabric.

DETAILED DESCRIPTION OF THE PREFERRED EMBODIMENT

In general, the various aspects of the invention herein relate to hands-free lighting, components thereof, and other accessories therefor combined with the hands-free lighting. As further described below, the hands-free lighting may include lighted headgear such as hats, including baseball caps, hoods, and other lighted clothing items having the lights positioned thereon to provide lighting forwardly of the wearer. The hands-free lighting include configurations to provide illumination in multiple directions, streamlined configurations to dissipate heat generated by the light source, multi-functional switches concealed in the headgear, and robust power source holder configurations that generally reinforce connections to the battery yet still permit some flexibility of the power source holder. Other accessories associated with the lighted headgear include a camera mounted to headgear having a flash thereon configured to reduce the effects of red eye, removable packaging materials with a protective guard that limits inadvertent actuation of a switch to energize the lights of the lighted headgear, or a relatively flexible battery holder coupled to the lighted headgear in a streamlined manner.

A first embodiment of hands-free lighting having a light source configured to direct light in multiple directions is illustrated. In general, the lighted hat and other headgear described herein include a variety of different illumination sources, which are preferably LEDs, mounted at different locations on the hat. To energize these illumination sources, a variety of different power assemblies can also be used that employ varying mechanisms to generate energy. For instance, as disclosed in Applicant's U.S. application Ser. No. 11/941, 558, which is incorporated herein in its entirety, the power sources may include power generators that use renewable energy, such as solar, wind, or kinetic energy, or various battery configurations in order to generate electrical power that ultimately energizes the variety of light sources that may be included on the disclosed hats. While the following description and illustrations may describe a conventional battery power source, renewable power generators as described in the '558 application may also be included in the hat embodiments. In addition, while the preferred headgear is a baseball-type hat or cap, the power assemblies and illumination sources may also be mounted to any suitable headgear, such as visors, helmets, headbands, hoods, or the like.

Figure 1:
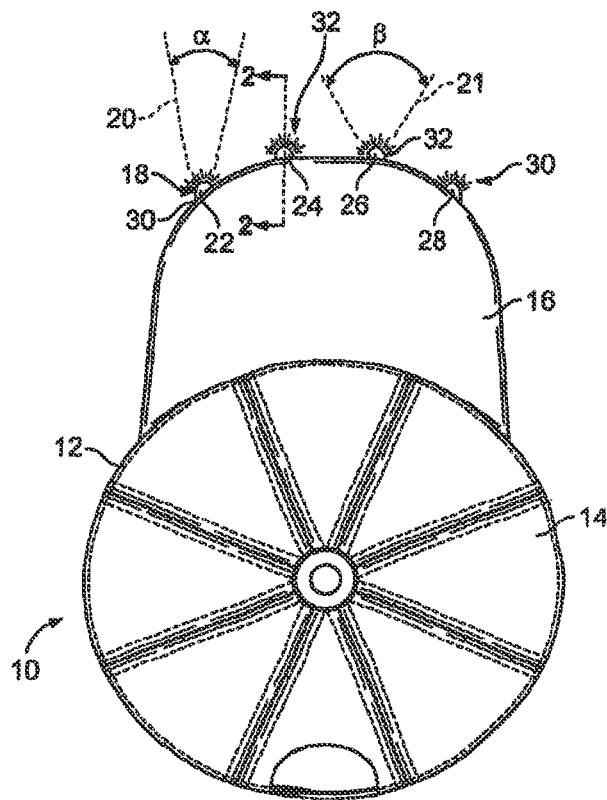
FIG. 1 is a plan view of a lighted baseball cap showing LEDs having a narrow light cone and LEDs having a wide light cone.
Figure 2:
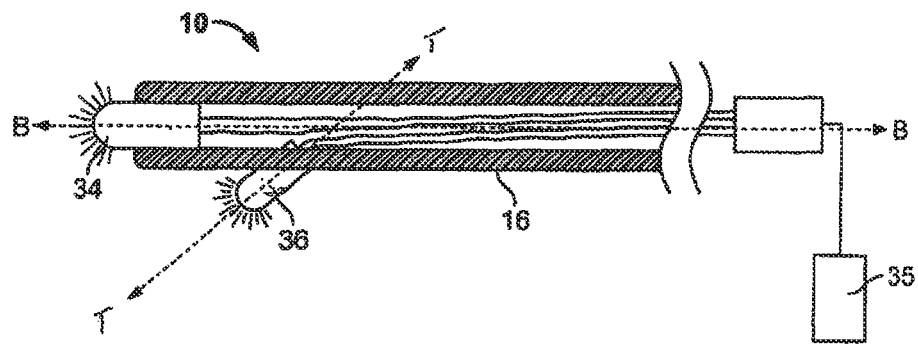
FIG. 2 is a cross-sectional view of a brim for a lighted baseball cap showing LEDs disposed on the brim to project light along different axes.
Figure 3:
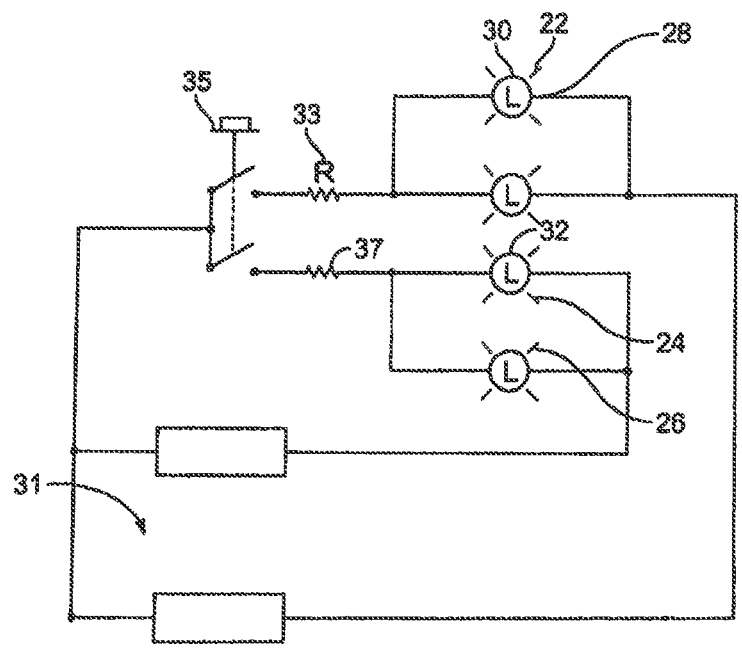
FIG. 3 is an exemplary circuit diagram of the electrical components for a lighted baseball hat including a switch that is in electrical communication with a power source and two sets of LEDs.

Referring to FIGS. 1-3, an exemplary lighted hat 10 is illustrated embodying light sources 18 configured to illuminate in multiple directions. The hat 10 is illustrated as a baseball-type cap 12 having a crown 14 and a brim 16 projecting forwardly from a lower, forward edge portion of the crown 14. In this embodiment, the hat 10 is designed to provide illumination from the light sources 18, which are generally configured to focus illumination at a variety of different distances from the hat 10. Previous hat designs typically included dimmer switches that vary the intensity of the illumination; however, such dimmer switches do not vary the angle or direction of the illumination while maintaining the same degree of illumination intensity. As further described below, the lighted hat 10 can illuminate objects at various distances or positions while maintaining the same illumination intensity. By one approach, the hat 10 includes the light sources 18 configured to provide illumination with various light cone angles 20. In another approach, the hat 10 has the light sources 18 mounted on the brim 16 to project lights along different axes.

Referring to FIG. 1, the plurality of light sources 18, preferably LEDs, can be configured and disposed on the hat 10 to provide forward illumination. In this illustration, light sources 22, 24, 26, and 28 spaced from each other along the outer edge or perimeter 29 of the brim 16 exemplify this embodiment. Preferably, one or more of the light sources 18, such as the light sources 22 and 28, are configured for illumination to a working distance away from the wearer, such as high beam lights of an automobile. In this regard, LEDs 22 and 28 can be considered high beam light sources 30. In addition, one or more of the light sources 18, such as the light sources 24 and 26, are also configured for illumination a working distance close to the wearer, such as low beam lights of an automobile. In this regard, LEDs 22 and 28 can be considered low beam light sources 32. In one instance, the working distance of the low beam light sources 32 is within a wearer's reading distance, such as between 24 to 30 inches from the light source 32 on the hat. The working distance for the high beam light sources 30 is outside or beyond the reading distance, which in some cases can be four to six feet from the hat 10.

By one approach, the high beam light sources 30 can provide illumination a distance from the wearer through an LED having a light cone 20 of a relatively narrow angle α to provide a concentrated beam of light that can be projected a distance from hat 10. In one form, the angle α is approximately about 15 to about 25 degrees, and preferably about 20 degrees. In other cases, the light beam is about 40 degrees.

The low beam light sources 32 are configured to project illumination close to the wearer such as to provide illumination for reading by providing an LED having a relatively wide light cone 21 of angle β. In one form, angle β is about 30 degrees to about 60 degrees and preferably about 40 degrees to about 60 degrees. In this manner, the high beam of light 20 comprises a smaller width cone angle α to allow illumination upon objects located at distances further away from the wearer, and the low beam of light 21 comprises a larger width cone angle β to expand the close range field of light and allow illumination upon objects that are located closer to the wearer.

In one embodiment, both the high beam 30 and low beam 32 light sources can be configured with a switch or device that may allow the wearer to select either the high beam light source 30 or low beam light source 32, as generally shown in FIG. 3. The switch or device 35 may be used to establish electrical communication between a power source 31 and the high beam light source 30 and/or the low beam light source 32 light and can be used to control the various light sources 22, 24, 26, and 28 at once or each light source individually and independently from another. When the switch 35 is closed to a first position, the power source 31 electrically energizes the high beam light sources 30 via a resistive load 33. The resistive load 33 restricts the flow of electric current by producing a voltage drop that occurs across the resistor 33. In turn, the resistive load helps create the illumination of the light source through an increased voltage pursuant to Ohm's law of V=IR. When the switch 35 is closed to a second position, the low beam 32 light source is electrically connected to the power source 31 via a resistive load 37.

Referring to FIG. 2, an alterative form of a high beam/low beam lighted hat is illustrated. In this embodiment, the brim 16 of the lighted hat generally extends a fore-and-aft direction along a brim axis B, and the lighted hat 10 has at least one light source 34 positioned to direct light generally along the brim axis B and at least one light source 36 disposed on the brim 16 and configured to direct light transversely relative to the brim axis B such as along an axis T that extends transverse to the brim axis B. In this embodiment, the light sources 34 and 36 are configured to illuminate objects in areas that are different distances away from the hat. For example, the light source 34 along the brim axis B will provide illumination upon an object or a location at a distance relatively far away from the wearer (i.e., such as approximately four to six feet from the wearer), and the light source 36 inclined to the brim axis B along the transverse axis T will provide illumination upon an object or a location at a distance closer to the wearer (i.e., at a reading distance such as 24 to 30 inches) without requiring the wearer to shift his head in any given direction. The light sources 34 and 36 can have similar light cones, or can also have the narrow and wide light cones 20 and 21 as described above.

Figure 2A:
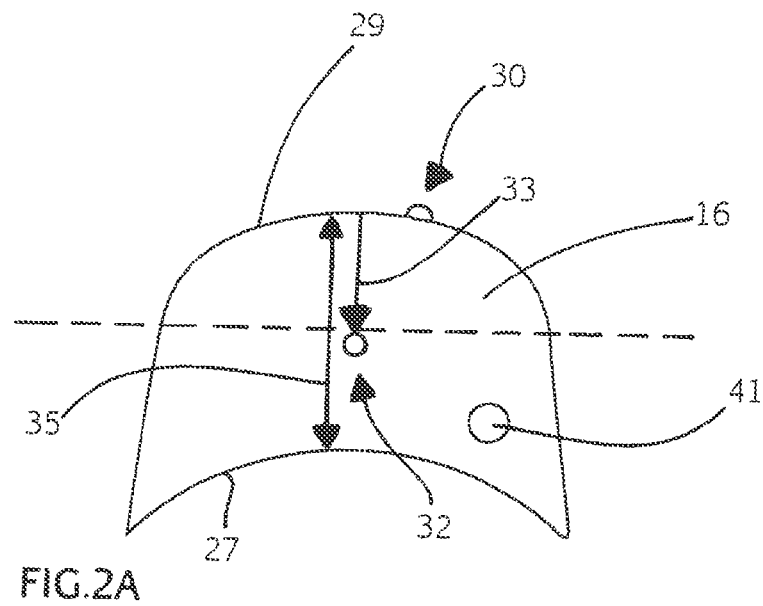
Figure 2B:
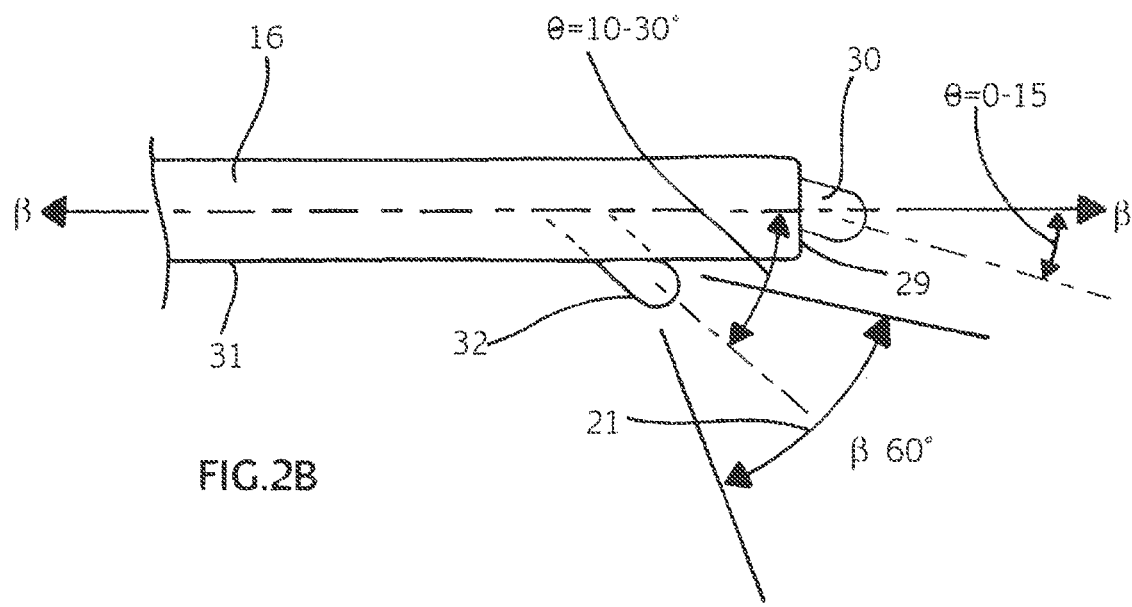

Referring now to FIGS. 2A and 2B, another alternative form of the high beam/low beam lighted hat is shown. In this form, the hat includes at least one high beam light source 30 mounted to a perimeter edge 29 of the brim 16, which may include a relatively narrow cone of light 20 such as a 20 to 40 degree light cone. The hat also includes the second or low beam light source 32 (a so called "look down" light source) mounted on the hat brim 16 remote from the perimeter edge 29, such as on a lower major surface 31 of the brim 16 as best shown in FIG. 2A. To this end, the low beam light source 32 may be mounted on the lower major surface 31 of the hat brim 16 and spaced rearwardly from the brim front edge 29 a distance 33 approximately halfway, and preferably more than half the fore-and-aft distance 35 between the front edge 29 and rear edge 27 of the hat brim, as shown. This position of the low beam light source 32 is advantageous because it directs light within a wearer's field of view to illuminate within a reading distance but at the same time avoids directing light towards other near the hat wearer, which can disadvantageously shine into other's eyes causing irritation and temporary blindness.

By one approach, the low beam light source 32 mounted on the lower surface 31 is canted at an angle θ1 relative to an axis B extending through the hat brim 16 so that the low light beam 21 is directed forwardly of the hat brim 16 to illuminate an area relatively close to the hat brim. Preferably, the cant angle θ1 is about 15 to about 30 degrees, and most preferably about 20 degrees. More particularly, the low beam light source 32 is a 50,000 MCD light emitting diode having a 60 degree light cone, and as discussed above, has the cant angle θ1 from the brim axis B of about 20 degrees. As mentioned, by mounting the low beam light source 32 away from the brim perimeter edge 29 and canting the light forwardly, the direction of the low light beam 21 does not shine in the direction of others near the person wearing the light hat. Advantageously, such canting of the low beam lights 32 illuminates areas adjacent the wearer in their field of view (i.e., reading distance), but does not blind others near the hat wearer.

The high beam light source 30 is positioned to extend from the perimeter edge 29 of the hat brim 16 to direct light forwardly of the wearer. By one approach, the high beam light source 30 may also be canted relative to the brim axis B at a cant angle θ2, but is canted over a smaller angle θ2 than the low beam light 32. For example, the high beam light may be canted 0 to about 15 degrees downwardly from the axis B. More specifically, the high beam light 30 may be a 20,000 MCD light emitting diode having a 40 degree light cone that is canted downwardly from an axis B extending through the hat brim 14 about 15 degrees.

The hat may include multiple high beam or low beam light sources on the hat brim. By one approach, the lighted hats may have at least two LEDs spaced from each other on opposite sides of a centerline of the hat brim, such as provided in Applicant's U.S. Pat. No. 6,659,618, which is incorporated herein in its entirety. By having two spaced LEDs on either side of the brim center line, the lighted hats may provide enhanced illumination with sufficient lighting of an area to be illuminated. By positioning the light source away from the hat's centerline and maintaining the spacing of the LEDs from each other on the brim, the hats herein offer enhanced depth perception of an area to be illuminated because the illumination from the spaced LEDs provide well defined shadows and texture to the object being illuminated.

The high beam light source 30 and low beam light source 32 are spaced from each other. To this end, the lights 30 and 32 are mounted on different portions of the hat brim. For example and as mentioned above, the high beam light source 30 is mounted to extend from the brim's outer perimeter edge 29, and the low beam light source 32 is mounted to extend downwardly from the major surface 31 forming the brim's lower or underside. As a result of this configuration and positioning of the lights 30 and 32, the low beam light cone 21 and the high beam light cone 20 preferably do not intersect or overlap each other and provide separate and discrete cones of illumination for differing purposes (i.e., far illumination and close-in illumination). When both sets of lights are energized, the wearer will not need to redirect their head to focus light on close and far objects, the wearer simply needs to move their eyes without head movement as the hat already directs illumination in two different directions and orientations.

The form of the lighted hat may also include a single or multi-function switch 41 positioned on the lower brim surface 31. In one aspect, the switch 41 may be a multi-position switch that includes one or more positions or modes, such as at least a 4-position switch to select varying modes of illumination. For example, the switch 41 can select either one of the high beam or low beam illumination or both at the same time, vary intensity of one or both light sources, vary color, and the like.

For energizing the light source, the lighted hat may include two battery packs mounted in the hat. In one configuration, both battery packs are electrically connected to both the low beam and high beam lights, but in another configuration, one battery pack is electrically connected to the low beam lights and the other battery pack is connected to the high beam lights. In this situation, the battery configuration can be optimized for each set of lights. For instance, additional battery power can be provided for either the low or high beam lights as the case may be to provide additional illumination.

Optionally, rather than fixed angles of illumination, the light sources 34 and 36 can be configured to pivot via a pivot shaft (not shown). The pivoting mechanism can be electrically controlled by a switch 35 which is operable to rotate the pivot shaft and the light sources 34 and 36 secured to the shaft to illuminate along axes parallel or transverse to brim axis B.

Figure 4:
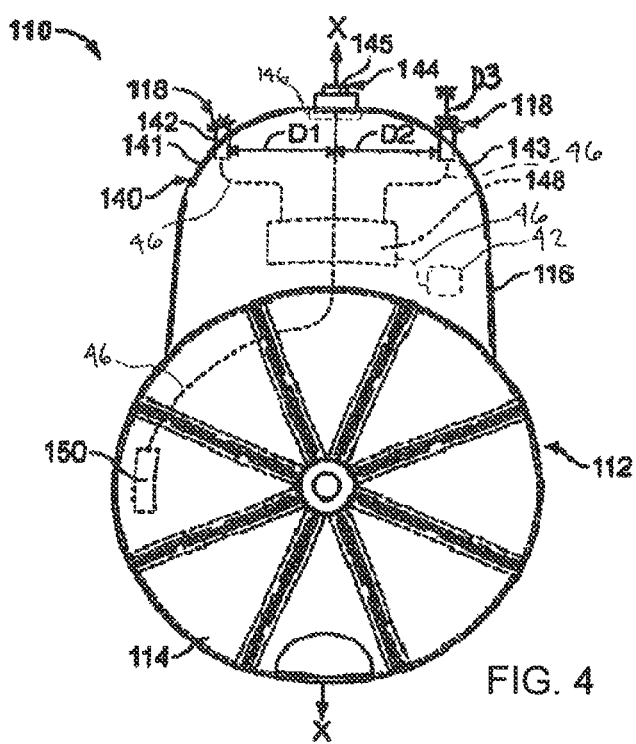
FIG. 4 is a plan view of a lighted baseball cap showing a camera including a lens and white LEDs mounted to the cap brim in electrical communication with a flexible printed circuit board and a power source shown in phantom.
Figure 5A:
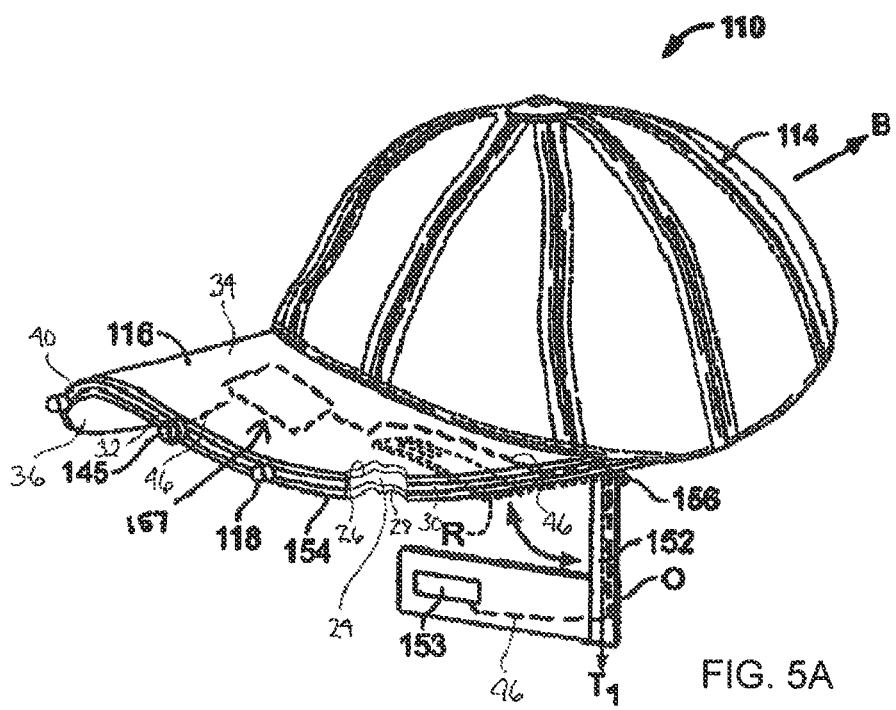
FIG. 5A is an perspective view of a lighted baseball cap showing a camera, lens, flash LEDs, and a viewfinder capable of rotating about a pivot shaft mounted on the cap so that the viewfinder can pivot from a retracted position extending along an underside of the hat brim and an operative position to extend transversely to the brim in the line of sight of a wearer.

Referring to FIGS. 4 and 5, a lighted hat 110 is illustrated in the form of a camera hat. The camera hat 110 is illustrated as a baseball-type cap 112 having a crown 114 and a brim 116 projecting forwardly from a lower, forward edge portion of the crown 114; however other headgear can also be utilized as described herein. In this embodiment, the camera hat 110 includes a camera 144, which can be combined with one or more light sources 118 that allow the wearer to operate the camera 144 without having to steady and aim the camera with the wearer's hands. The light source 118 can be energized to provide illumination or can be energized automatically as a flash 142 for the camera 144 when a picture is taken therewith.

Referring now to more details of an exemplary hat, the brim 116 includes an upper major surface 26, a lower major surface 28 and a brim insert 24 having side edges 30 and a front edge 32. An upper and lower covering 34, 36, such as a fabric covering, may be disposed across the upper and lower major surfaces 26, 28 of the brim insert. The upper and lower coverings 34, 36 may be joined together, such as by stitching, adhesive, or the like, at a perimeter edge 38 of the brim 116 with narrow piping material or other fabric material 40. The hat 110 may further include a switch 42, including, for example, a pushbutton switch, a slide switch, a rotary switch, or the like, disposed on a portion of the hat 110, such as one of the upper or lower major surfaces 26, 28, upper or lower covering portions 34, 36, the perimeter edge 38, or on other portions of the crown 114. The hat 110 may also include a power source 44, which is illustrated as a battery pack stored in the hat band 20 of the crown 114. The power source 44 may also be located in other portions of the hat. Electrical connections 46 are provided between the power source 44, the switch 42, and other lighted hat components, such as light sources, in the form of leads and the like to provide power thereto.

More specifically and referring to FIG. 4, the camera hat 110 has the LEDs 118 and camera 144 positioned on an outboard edge 140 of the brim 116. Preferably, the camera 144, such as a digital camera, has a lens 145 positioned along a centerline axis X of the hat 110 so that a photograph of an object directly in front of the wearer can be easily taken by the wearer simply looking directly at the object. Preferably, the outboard edge 140 curves from the crown 114 so that the centerline axis intersects with the outboard edge 140 at its furthermost point from the crown 114. In one form, the lens 145 is received within a notch or recess 146 formed in the brim 116, and more specifically, the brim insert 24, so that the lens 145 is at least partially received within the brim 116. The LEDs 118 are preferably spaced a predetermined distance D1 and D2 from the hat centerline X. Most preferably, the LEDs 118 are positioned adjacent opposite arcuate side portions 141 and 143 of the brim outboard edge 140. In this manner, the LEDs are also disposed rearwardly of the camera by a distance D3 along the brim fore and aft axis X. By way of example and not limitation, distances D1 and D2 can each be approximately 2.5 inches to 3 inches and the distance D3 can be approximately 0.75 inches to 1.5 inches. As a result, the distances D1 and D2 of the LEDs 118 are sufficiently spaced from the lens 145 so that when the LEDs are energized as a flash for the camera 144, red eye effects can be reduced because the flash source (i.e., the LEDs 118) are off-angle to the center of the eyes. Red eye is generally the result of the light from a camera's flash reflecting off a person's retina; as a result, by positioning LEDs 118 the distances D1 and D2 away from the lens 145, red eye can be reduced and, preferably, eliminated. In one form, the lens 144 and LEDs 118 can be in electrical communication with a printed circuit board 148 that is connected to a power source 150. In addition, by having the lens 144 and the LEDs 118 disposed along the brim outboard edge 140, the hat 110 maintains the more natural and streamlined appearance of a traditional baseball hat.

The camera 144 can be a digital camera capable of taking individual photos, groups of photos, and/or video. By one approach, the camera 144 can operate at less than 30 frames per second, and preferably about 25 frames per second. By another approach, the camera 144 can operate at least at 30 frames per second to generate high definition images therewith.

The camera 144 has been described as being mounted to an edge 140 of the brim 116, however, the camera 144 can also be mounted to or adjacent to the upper or lower major surfaces 26, 28 of the brim 116. For example, the camera 144 can be mounted to the brim upper major surface 26 so that the camera 144 or the leads or wiring 46 extends through the upper covering portion 34. By another approach, the camera 144 can be mounted to or adjacent to the brim lower major surface 28, such as within an internal or external mounting base. Co-pending U.S. application Ser. No. 12/714,403, filed Feb. 26, 2010, describes in part various methods and apparatus for mounting light sources to the brim lower major surface, which is hereby incorporated by reference herein in its entirety. The various methods and apparatus for mounting light sources as described in U.S. application Ser. No. 12/714,403 are equally applicable to the camera lens 144 or can having a camera lens added thereto, so that the camera is secured beneath the brim. This advantageously protects the camera 144 from exposure to the elements, such as sunlight and precipitation. It can further protect the camera 144 from physical damage if the headgear is inadvertently dropped.

Referring to FIGS. 4 and 5, the camera hat 110 may include a viewfinder 152. The viewfinder 152 allows the wearer to see the image that the lens 145 is focused on without requiring the wearer to use his hands position the camera in front of his/her eyes. In one form, the viewfinder 152 is pivotally mounted at the underside 154 of the brim 116 for pivoting from a retracted position R extending along the underside 154 of the brim 116 (dashed lines) to an operative position O pivoted away from the underside 154. In the operative position O, the viewfinder 152 is positioned in front of the eye of a person wearing the hat. To this end, the viewfinder 152 is configured to pivot about an axis P via a pivot shaft 156 between the retracted position R and the operative position O. Preferably, when the viewfinder 152 is in use, it will be disposed along an axis T, which extends transversely and preferably orthogonally to the brim axis B to position the viewfinder 152 to allow the wearer to optimally see the image. Preferably, the viewfinder 152 provides the user with a real time visual image of what the lens 145 is focused on at that given time. To this end, the viewfinder 152 may include a small display 153, such as an LCD screen or equivalent, that projects an image being seen through the lens 145 for viewing by the wearer. An image transfer mechanism 147 conveys the image being viewed by the lens 145 and transfers the image for being viewed on the LCD screen of the viewfinder 152.

Figure 5B:
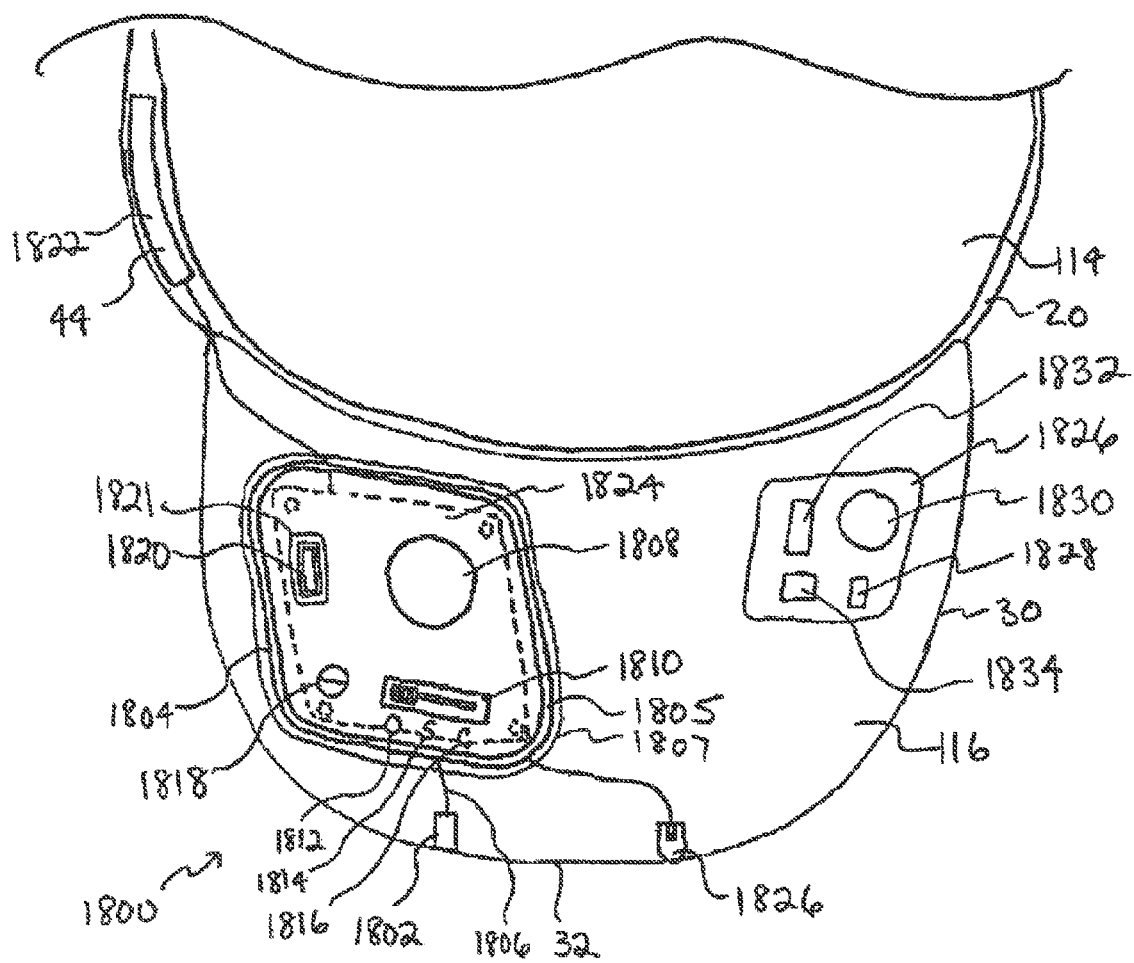
FIG. 5B is a bottom plan view of a camera hat having a control panel mounted to a lower surface of a brim and a camera mounted to an edge of the brim.

Another exemplary camera hat 1800 is shown in FIG. 5B. The camera hat 1800 includes a camera 1802 disposed or mounted to an edge 30, 32 of the brim 116 (or other portion of the hat) connected to a control panel 1804 by electrical connections 1806, such as wiring or printed circuit boards. The camera 1802 could alternatively be mounted to the upper or lower major surfaces 26, 28 of the brim 116, or the crown 114 as desired. As shown, the control panel 1804 is mounted to the lower major surface 26 or the lower covering 36 of the brim 116, but could also be mounted to the upper major surface 28 of the brim 116 or the crown 114 as desired. In the illustrated form, the control panel 1804 is attached to the lower covering 36 of the brim 116, such as by stitching, staples, adhesive, welding, or the like. To this end, the control panel 1804 may include a groove or channel 1805 adjacent a perimeter edge 1807 of the control panel 1804. The groove 1805 advantageously provides a thinner cross section through which a needle or staple may pass to secure the holder to the brim or, alternatively, substantially conceals threading, staples, or other mechanical fastening element from view because such fastener is received within the groove 1805.

In the illustrated form, the control panel 1804 includes a switch 1808, such as a push button switch, slide switch, or the like, configured to send a control signal to the camera 1802. The control panel 1804 further includes a setting switch 1810 configured to set the operation settings of the camera 1802. As illustrated, the setting switch 1810 allows a user to select between a first position 1812 to turn off the camera 1802, a second position 1814 to take single snapshots or photos with the camera 1802 upon actuation of the switch 1808, and a third position 1816 to take a continuous video with the camera 1802 upon actuation of the switch 1808. The control panel 1804 can also include a status indicator 1818, in this form an LED. The LED 1818 can utilize color, blinking, or the like to indicate whether the camera 1802 is on, recording video, taking a photo, or the like. The control panel 1802 can also include a USB port 1820 or other connection device, such as utilizing other connecting heads, wireless connection methods such as Bluetooth, infrared, Wi-Fi or the like. The USB port 1820 can be utilized by a user to download photos or video, such as from a memory 1823, which can take any suitable form and may be removable or permanently mounted to the brim 116. By another approach, the USB port 1820 can also be utilized to charge a power source 1822 configured to provide power to the control panel 1804 and the camera 1802. The USB port 1820 may further include a cover 1821 configured to tightly fit thereon to protect the USB port 1820, as well as prevent foreign matter from entering the port 1820. By one approach, the cover 1821 may be formed from a flexible material, such as rubber, flexible plastic, or the like. By another approach, the cover 1821 may be hingedly attached to the control panel 1804, such as to pivot or flip off of the USB port 1820, so that the cover 1821 can be removed from the USB port 1820 without being removed from the control panel 1804 because such completely removable covers are easily lost. As shown, the control panel 1804 is attached to a circuit board 1824, such as by snap-fit, hardware, ultrasonic welding, adhesive, or the like. The control panel 1804 and the circuit board 1824 can be attached to the brim 116 by a clamping mechanism, stitching, adhesive, hardware, or the like. Preferably, the circuit board 1824 is a printed circuit board and is positioned above the lower major covering 36 of the brim 116. The control panel 1804 can then be provided below the lower major covering 36 of the brim 116 and attached to the circuit board 1824 to sandwich the lower major covering 36 therebetween.

By another approach, the camera hat 1800 can include sound system 1826, including various sound system components, such as a microphone 1828, one or more speakers 1830, volume control 1832 in the form of push buttons, a rotary switch, or other suitable actuating mechanisms, or the like along with a memory 1834 to further be configured to record sound, which can also be utilized in conjunction with the video feature of the camera hat 1800. As shown, the sound system 1826 is entirely disposed on the brim 116, such as to the upper or lower major surfaces 26, 28 thereof; however, the components can be separated and/or distributed to other portions of the hat 1800.

The camera hat 1800 may further include a light source 1826, such as disposed in the front edge 32 of the brim 116 as shown, or mounted elsewhere on the hat 1800 as described herein. The light source 1826 can provide a flash for a photograph, a continuous stream of light for a video, or the like. So configured, the necessary controls are provided on the control panel 1804 that is substantially concealed on the lower major surface 32 of the brim 116. The control panel 1804 as described above, can further be used in combination with the below described switches, switch guards, and/or heat sinks. This preserves the aesthetics of the hat 110, as well as provides an apparatus to take stealthy video and photos.

Figure 6:
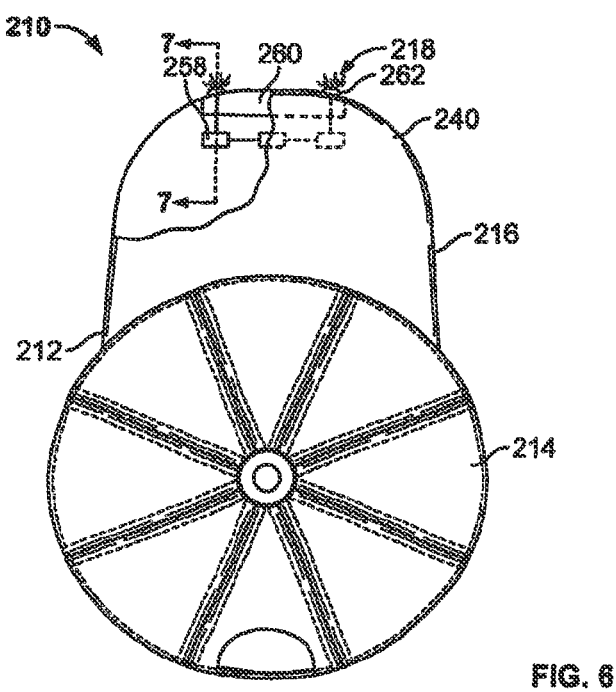
FIG. 6 is a fragmentary, plan view of a lighted baseball cap showing a flexible printed circuit board, a relatively thin and flexible heat sink, and an LED that is configured to provide illumination outward from the hat.

Referring to FIGS. 6 and 7, a hands-free lighted hat 210 that includes high intensity LEDs 118 is shown together with a flexible printed circuit board (PCB) 258 and a heat sink 260. The lighted hat 210 is illustrated as a baseball-type cap 212 having a crown 214 and a brim 216 projecting forwardly from a lower, forward edge portion of the crown 214; however other types of headgear may also be used with this embodiment. In this embodiment, the hat 210 is configured to provide illumination outwardly and forwardly therefrom via relatively high intensity LEDs 262, such as high intensity surface mount LEDs 262, where the heat sink 260 is positioned to dissipate heat generated from these high intensity LEDs 262.

Referring to FIG. 6, the hat 210 includes at least one light source 262 disposed on the hat brim 216 to provide forwardly directed illumination. As discussed above, the light source 262 is preferably at least one and, preferably, two spaced surface mount LEDs disposed at or adjacent to an outer edge 240 of the brim 216. The surface mount LED provides a low profile light source, but also generates a relatively high amount of heat, especially when provided in the higher intensities needed to direct illumination to an area forwardly of a wearer sufficient to provide illumination for reading. For efficient operation of the light source, the heat is dissipated by the heat sink 260 therein.

The hat 210 also preferably includes the flexible PCB 258, which can be used to provide electrical communication between at least one of the light sources 262 and a power source (not shown in this view). The flexible PCB 258 may also be connected to the heat sink 260, preferably in a manner that avoids sufficiently increasing the profile of the lighted hat 10, and particularly the brim 216 thereof.

In one aspect, the flexible PCB 258 may be formed from about 0.5 to about 5 mil thick film or include multiple layers of such films. The flexible PCB 258 should have sufficient flexibility to bend or curve to be fixed to the curved brim, such as either along one of its main curved surfaces 230, 232 or about the outboard, curved edge 234 thereof. That is, the flexible PCB 258 should be capable of being curved to have a radius of curvature about 3 to about 7 inches for being mounted flush to one of the brim main surfaces 230, 232 or 234; however, greater or less flexibility may also be acceptable depending on the particular design of the lighted hat 10 or other headgear. Alternatively, as mentioned, the flexible PCB 258 should be sufficiently flexible to curve or bend around the outer edge 240 of the brim 216.

Referring to FIGS. 7A and 7B, the flexible PCB 258 can be positioned at different locations on the lighted hat 10 with respect to the heat sink 260. As shown in FIGS. 6 and 7A, one position of the flexible PCB 258 is on the shape-retentive brim insert 259 spaced from the heat sink 260 also mounted to the brim 216 and between the upper and lower fabric panels or panel portions 264 covering the brim 216 such as to minimize any bulky outward appearance of the additional components in the hat 210. To this end, the thickness of the PCB 258 and the thickness of the heat sink 260 are substantially the same to form a uniformly thick hat brim 216.

Alternatively, as shown in FIG. 7B, the flexible PCB 258 extends along a major surface 230 of the shape-retentive brim material 259 and is bent over the brim outboard edge 240. In this configuration, the heat sink 260 may also be in contact with the PCB 2580 and bent over the brim outboard edge 240. If necessary, optional insulation or other protective material may be provided between the heat sink and circuit board if necessary to maintain conductivity with the light source 262. FIG. 7B shows the heat sink 260 extending between the PCB 258 and the brim upper panel 264. By another approach, the heat sink 260 extends below the PCB 258, as illustrated in FIG. 7C. The upper and lower heat sinks 260 can further be combined, as illustrated in FIG. 5C to advantageously dissipate heat from both sides of the PCB 258.

As described above, the camera 144, 1802 is in electrical communication with the printed circuit board 148, 1824 that is connected to a power source 150. Accordingly, the heat sink(s) 260 as described above can further be utilized to dissipate heat generated by operation of the camera 144, 1802 and its associated board 148, 1824 and/or electronics. For example, the heat sink 260 can extend along the circuit board 148, 1824 and include a bend to be positioned adjacent to the camera 144, 1802 positioned at the brim outboard edge 140, such as shown with the light source in FIG. 7B. The headgear can further include the heat sink 260a below the circuit board 148, 1824, as discussed above. The head sink 260a can be made of a variety of materials including aluminum, tin or any other conductive type metal. Alternatively, the heat sink 260, 260a positioned above and/or below the circuit board 148, 1824 can be in communication with the camera 144, 1802 mounted to the upper or lower major surfaces 26, 28 of the brim 116. For some uses, it is desirable to block emissions generated by operation of the camera 144, 1802, such as utilizing a digital camera operating at 30 frames per second or more. For such uses, the heat sinks 260, 260a positioned above and below the circuit board 148 advantageously can be configured to block radio frequency emissions, such as to comply with any applicable rules or regulations.

In this regard, for instance when used with control panel 1804, the heat sink 260, 260a can be configured to have the same footprint as the panel so that they are congruent with each other, e.g. rectangular, so as to cover the electronic components presented therein and block RF emissions therefrom.

As best shown in FIGS. 7A and 7B, it is preferred that light sources 262 are surface mount LEDs. However, surface mount LEDs sized to generate sufficient illumination also can generate a relatively large amount of heat. In order to properly keep the surface mount LED functioning properly, the heat sink 260 is used to absorb and dissipate the heat that is given off from the LED. This will in turn protect the LED and its components from being damaged by the heat.

The heat sink 260 can be made of a variety of materials including aluminum, tin, or any other conductive type metal. In a preferred embodiment, in order to reduce the thickness and profile of the hat brim 216, the heat sink 260 is formed from a relatively thin and flexible sheet of thermally conductive material. To this end, the flexible heat sink 260 may be curved to conform to the curved brim portion 216 and also include a bent portion 261 extending over the outboard edge 240 of the brim as shown in FIGS. 7A and 7B. In this manner, the surface mount LED 262 may be directed mounted to the heat sink bent portion 261 on the hat outboard edge 240 and the heat sink has a sufficiently large surface area via the bent portion 261 and a major portion 263 extending across the brim surface in order to dissipate heat.

Referring to FIGS. 8-10A, one embodiment of a brim mounted activation switch in the form of a rotary switch 366 is illustrated. The rotary switch 366 can be used to energize, de-energize, or change the illumination intensity of the at least one light source on the hat. Preferably, the rotary switch 366 is located on brim 316 and is disposed in a way to substantially maintain the natural streamlined appearance of the brim 316. The wearer will be able to energize a light source by rotating the switch 366 a predetermined rotary distance in one rotary direction and similarly de-energize the light source by rotating the switch 366 in an opposite rotary direction.

Figure 9:
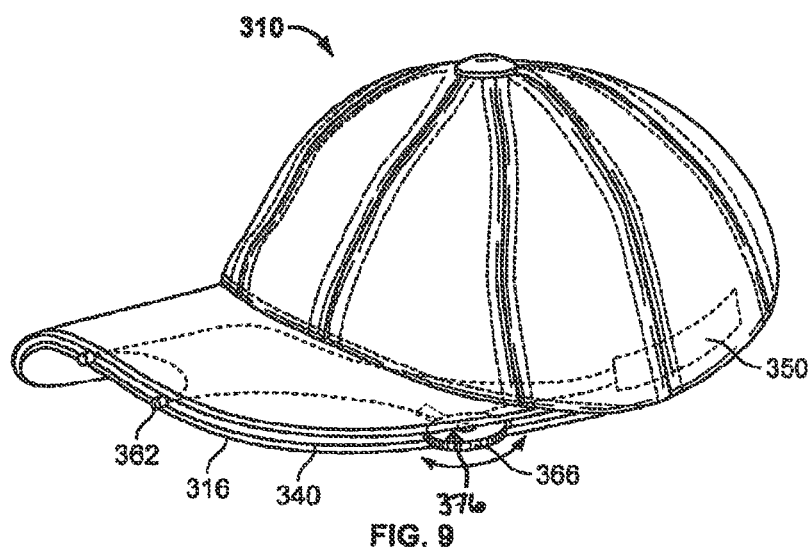
FIG. 9 is a perspective view of a lighted baseball cap showing the rotary switch projecting outwardly from an opening in an outboard edge of the brim.
Figure 10A:
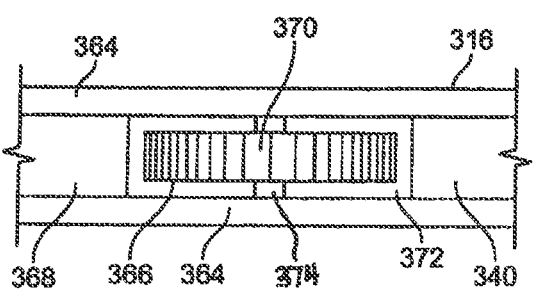
FIG. 10A is a side elevational view of the brim showing the rotary switch mounted on a shaft for rotation thereabout.

More specifically, the rotary switch 366 is mounted to the hat brim 316 so that it projects outwardly from an outboard edge 340 of the brim as illustrated in FIGS. 8 and 9. In this configuration, the rotary switch 366 is disposed along the brim edge 340 between the upper and lower brim covering fabric 364 and 365 so as to minimize the profile of the hat brim 316. In one embodiment, the rotary switch 366 has an annular, wheel actuator 370 for being turned in a rotary direction about a vertical shaft 374 extending between the upper and lower fabric panels 364 so that a portion 376 of the wheel action for 370 projects through an elongated slot 372 formed in the brim edge 340 adjacent the shaft 374 (FIG. 10A). The actuator 370 is configured such that a wearer's thumb, finger, or other appendage can quickly and easily engage the actuator 370 to turn it in a rotary direction in order to activate the light source 362. Alternatively, the switch 366 can also include a push-button-type function where the switch 366 can be depressed to energize other electronic cap features, e.g., the camera 144 and/or flash LEDs 118. For example, depression of the push-button switch 366 could take a picture, turn video recording on and off, or the like.

By a further approach, rotation of the rotary switch 366 can operate a zoom function for the camera 144, 1802, including for photos and video. For example, clockwise rotation can zoom in the camera 144, 1802 out and counterclockwise rotation can zoom out the camera 144, 1802. Alternatively, the rotary switch 366 can include a first momentary radial position that zooms the camera in and a second momentary radial position that zooms the camera out. In this configuration, the switch 366 can further include a biasing mechanism, including a spring or the like, to urge the switch 366 back to a base or neutral position.

Figure 10B:
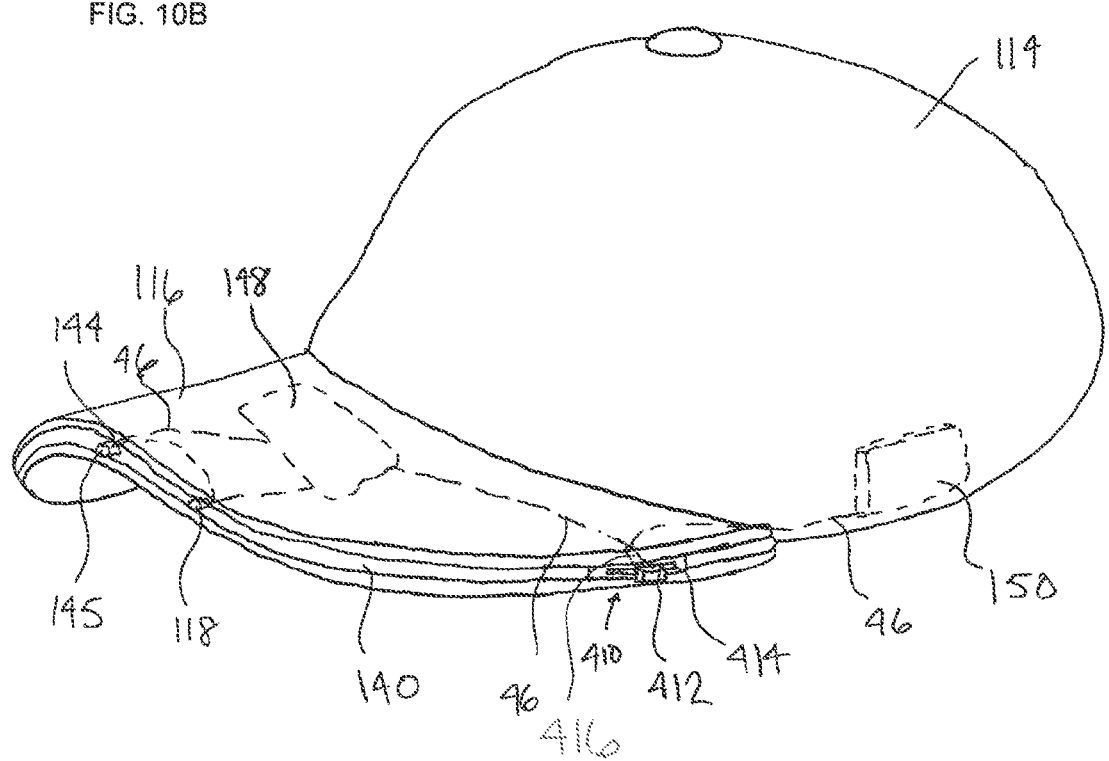
FIG. 10B is a perspective view of a baseball cap showing a momentary slide switch including a pushbutton mechanism with the switch being mounted to a side edge of the cap brim portion and connected to a camera and lights.
Figure 10C:
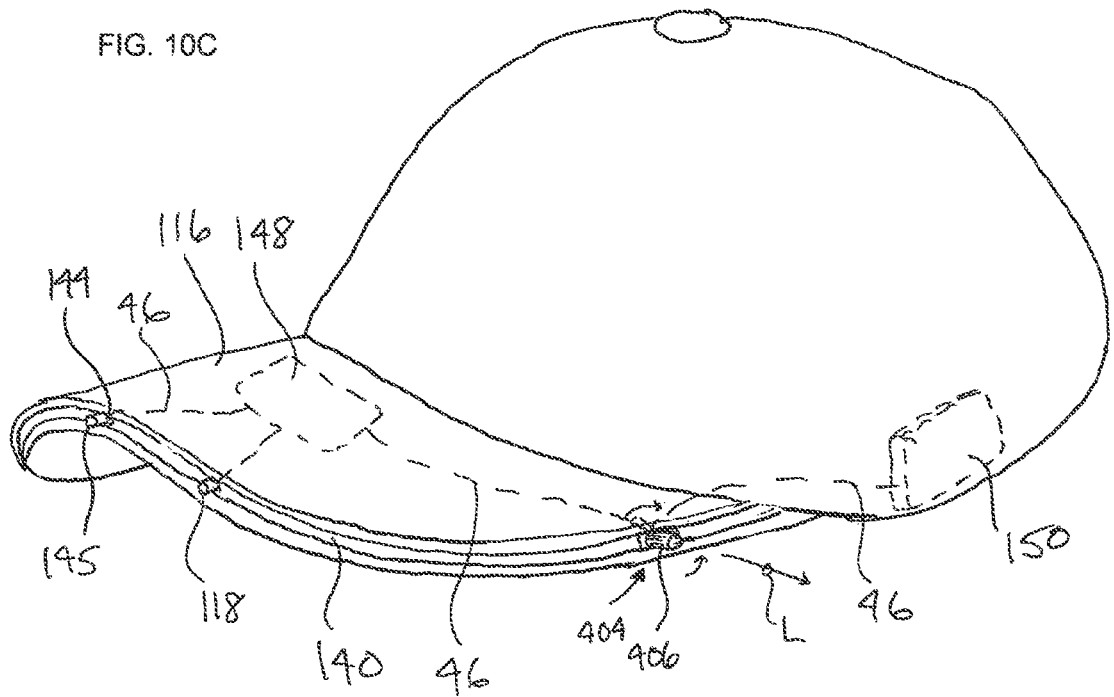
FIG. 10C is a perspective view of a baseball cap showing an alternative rotary switch having a pushbutton mechanism that rotates about a longitudinal axis thereof.

An alternative rotary switch 404 is illustrated in FIG. 10C as mounted to the hat brim 116, such as to the outboard edge 140 thereof. In this form, the rotary switch 404 is electrically connected to the camera 144 and one or more light sources 118 by the wires 46 for selective operation thereof. The rotary switch 404 can further be connected to the circuit board 148 and the power source 150. In this form, the rotary switch 404 includes a generally cylindrical shaft 406 and includes a longitudinal axis L. The rotary switch 404 can be rotated about the longitudinal axis L to operate the light sources 118 and/or the camera, such as has been described above, including energizing the light sources 118 or operating a zoom function for the camera 144. By one approach, the rotary function of the switch 404 operates as a momentary switch so that the camera 144 only zooms in and out or the lights 118 stay energized when the rotary switch 404 is turned and held in a rotated position. In this configuration, the switch 404 can further include a biasing mechanism, including a spring or the like, to force the switch 404 back to a base position without rotational displacement. Advantageously, the rotary switch shaft 406 can further be depressed to function as a pushbutton switch. The pushbutton mechanism can be utilized as a power switch for the camera 144 or to send a control signal to the camera 144 that, for example, takes a picture or toggles between on and off modes for video recording.

Alternatively, the headgear can include a slide switch 410 having a push button mechanism including a plunger 416 depending from a switch actuator 412 as illustrated in FIG. 10B, such as mounted to the outboard edge 140 thereof. In this form, the switch 410 is electrically connected to the camera 144 and one or more light sources 118 by the wires 46 for selective operation thereof. The switch 410 can further be connected to the circuit board 148 and the power source 150. In this form, the switch 410 includes the actuator 412 that can be slid or translated laterally along a track or elongated slot 414 formed in the brim 116. This dual function switch can be utilized, as described above, to operate the light sources 118 and/or the camera 144. For example, translating the actuator 412 laterally operates the zoom function of the camera 144 or energizes the lights 118. In this form, the switch 410 includes a first lateral momentary position to zoom the camera in and a second lateral momentary position to zoom the camera out. In this configuration, the switch 410 can further include a biasing mechanism, including a spring or the like, to force the actuator 412 back to a base position without lateral displacement. The pushbutton of the switch 410 can be utilized to operate as a power switch for the camera 144 or to send a control signal to the camera 144 that, for example, takes a picture or toggles between on and off modes for video recording.

Referring again to FIG. 8, the rotary switch 366 is illustrated in electrical communication with a power source 350 and the light sources 362 within the brim 316. By turning or pushing the rotary switch 366, the rotary switch 366 causes the power source 350 to energize the light sources 362 or other hat accessories. The rotary switch 366 and the other components can be completely located within a self-contained lighted brim 316 and disposed to maintain a thin and low profile or streamline appearance of the brim 316.

As described in U.S. application Ser. No. 11/941,558, the light sources 362 may operate in different illumination modes. For example, the light sources 362 may illuminate at the same time, may be illuminated separately, may blink, or illuminate in different patterns. In that regard, the rotary switch 366 may have multiple stops or energizing points to allow a user to select each of the modes. Similarly, the rotary switch 366 may be configured to select each of the above modes by being pushed or depressed.

Referring to FIGS. 11, 11*a*, and 12-14, a guarding or covering device 402 preferably in the form of a brim sleeve is illustrated for use in combination with a lighted hat 404 for providing a packaging cover for the hat and for providing a barrier to hinder or prevent inadvertent activation of a power switch 406 on the lighted hat 404. The brim sleeve 402 is advantageous because it provides both a packaging cover for the hat to provide information about the hat and, at the same time, protects against unintended power source activation, which enables a power source or other battery to be installed in the hat during manufacture so that the hat can be shipped to a retail store without the risk of the installed power source being inadvertently drained.

In general, the brim sleeve 402 is provided with a detachable covering 408, which is detachably securable to the hat 404, and a barrier wall or shielding member/portion 410 for protection against accidental actuation of the switch 406. The shield portion 410 protects the switch 406 from unintended actuation but, at the same time, still permits direct and intentional actuation of the switch 406 by a potential purchaser or other user. That is, the shield member 410 is configured as a protective barrier that is adjacent to and, preferably partially or completely surrounding the switch 406 so that an adjacent surface (such as a table, wall, or other nested hat 404*a* shown in FIG. 12) will not cause the switch 406 to be inadvertently depressed because the shield 410 keeps the adjacent surface spaced a predetermined distance from the switch 406 and, thus, restricts the adjacent surface from contacting the activation switch 406. At the same time, the shield member 410 also has an access opening sized to provide direct and intentional access to the switch 406 by the user for intentional actuation. In this manner, the hat 404 can be shipped to a store having a power source 411 installed without the risk of the unintentional activation of the power switch when the hat is contacted by an adjacent surface (such as with multiple hats nested together) that could drain the battery prior to the store shelf. At the same time, the shielding member 410 also permits the activation switch 406 to be intentionally activated through the access opening to allow a consumer to test the hat while it is on the store's display shelf.

Figure 11:
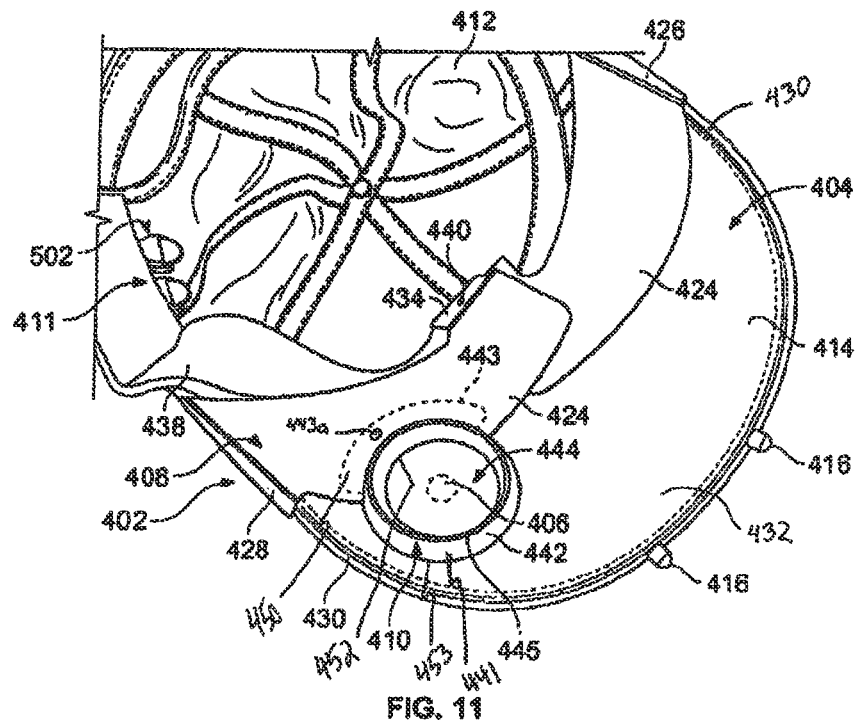
FIG. 11 is a bottom plan view of a lighted baseball hat showing packaging material that includes a protective guard for an activation switch.
Figure 13:
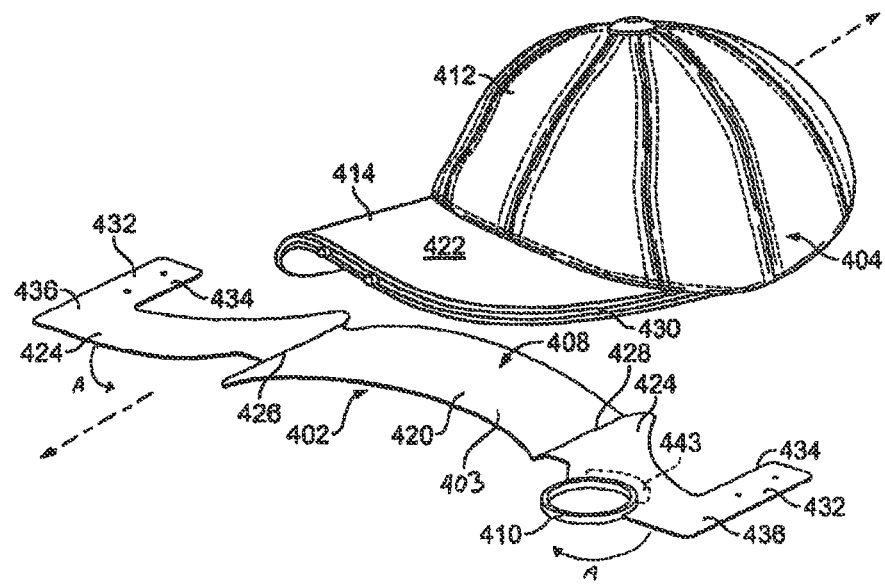
FIG. 13 is a perspective view of the lighted baseball hat showing the packaging material including the protective guard in an unwrapped configuration.
Figure 14:
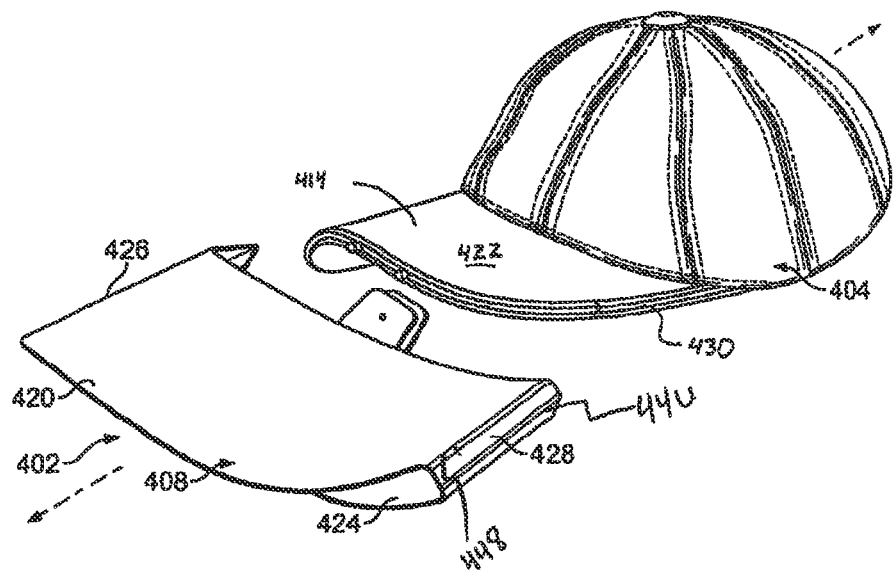
FIG. 14 is a perspective view of the lighted baseball hat showing the packaging material including the protective guard in a wrapped, sleeve configuration.

As shown in the drawings, the hat 404 may be a traditional baseball style hat haying a crown portion 412 and a brim portion 414 extending from a forward, lower edge of the crown portion 412 as shown in FIGS. 11, 13, and 14. The hat 404 also preferably includes one or more illumination sources 416, which can be any of the previously described light sources herein or described in related U.S. application Ser. No. 11/941,558, which is incorporated herein in its entirety. While the guarding device 402 is particularly useful in a configuration designed for the baseball-style hat, it will be appreciated that the guarding device 402 may also be configured for other types of headgear in a similar fashion. In addition, while the shielding member/portion 410 of the guarding device 402 is preferably intended to avoid unintended activation of the illumination sources 416, the shielding member 410 may also be used to prevent inadvertent actuation of other switches configured to operate additional accessories mounted to headgear, such as cameras, speakers, radios, MP3 players to suggest a few examples.

Figure 12:
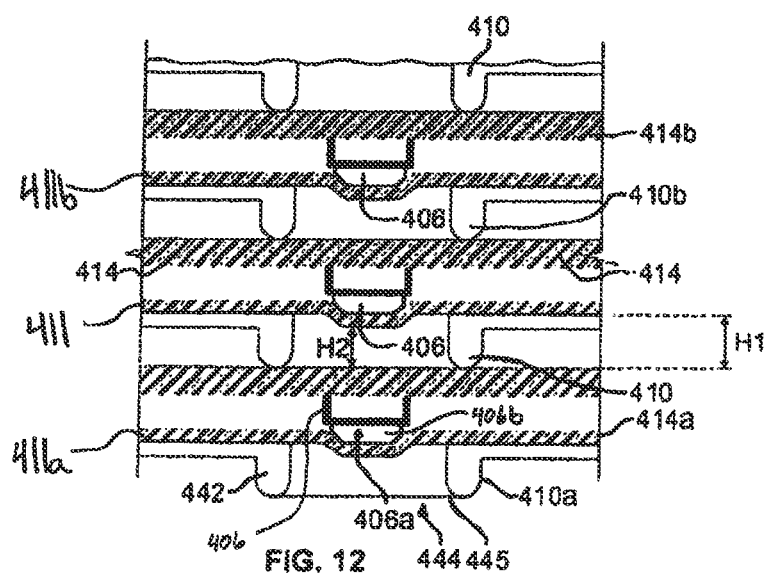
FIG. 12 is a cross-sectional view of the brims of a plurality of nested hats showing the protective guards keeping the adjacent brims spaced to avoid accidentally actuating the brim switches.

In one form, the shielding member/portion 410 of the guarding device may be particularly effective in preventing the inadvertent actuation of an illumination activation switch 406 having a depressable button or plunger actuator 406*a* for actuating the illumination source as generally shown in FIG. 12. The plunger actuator 406*a* of the switch 406 includes an outer button 406*b* that extends away from the brim and is depressable towards the brim to energize the light source on the lighted hat between an "on" or "off" state. To this end, if the button is depressed a first time, the light on the lighted hat is energized to its "on" state where the light will remain continuously in the on-state until the user again depresses the button or plunger a second time causing the switch to configure the lighted hat to its "off" state. As described more below, the shield member/portion 410 effectively prevents inadvertent actuation of the lighted hat by surrounding the activation switch and plunger thereof and extends farther beyond the surface of the hat than the plunger actuator. This additional distance the shield extends past the plunger is effective at preventing inadvertent depressing of the button or plunger actuator because the shield blocks or hinders access to the plunger actuator.

Turning to more of the details, the detachable covering 408 of the guarding device 402 effectively forms a sleeve that encircles the hat brim and includes a thin cardboard or paperboard body 403 (FIG. 13) having a top or major surface portion 420 configured to conform to an upper curvature of a top surface 422 of the hat brim 414 and is sized to extend across the top surface 422 of the brim 414 (FIG. 13). The brim sleeve body 403 also includes a pair of flap arms or side portions 424 extending from opposite side ends 426 and 428 of the body top portion 420. The flap arms or side portions 424 are configured so as to fold under the top portion 420 as generally illustrated in FIGS. 11 and 14 (see Arrows A in FIG. 13). Preferably, the flaps 424 have a length sufficient so that they overlap each other when in the folded configuration under the hat brim as best shown in FIG. 11. In this manner, when mounted to the hat 404, the brim sleeve top portion 420 extends across the upper surface 422 of the hat brim 414, and the brim sleeve arm side portions 426 are configured to fold under the brim 414 at the brim edge 430 and extend across a lower surface 432 of the hat brim 414 as best shown in FIG. 11. To this end, the packaging cover body 408 may include various folds, creases, or bends as needed to permit the arm flaps 242 to easily bend or fold around the brim edges 430.

The opposite side ends 426 and 428 of the brim sleeve are generally of the same thickness as the hat brim 414 (FIG. 14) and connect/extend between the brim sleeve top portion 420 and the flap arms or side portions 424 such that the detachable covering 408 may maintain a profile similar to the hat brim 414 when mounted thereto. To this end, the opposite side ends 426 and 428 each may have a lower edge 446 and an upper edge 448 (FIG. 14), which connect between the side portion 424 and the top portion 420, respectively. Both the lower edge 446 and the upper edge 448 may contain score lines, folds, creases, perforations or other indents therealong that facilitate bending of the cardboard or paperboard material of the brim sleeve body 403, which allow the opposite side ends 426 and 428 to maintain a similar profile and thickness as the brim edge 430.

Each of the flaps 424 permits the covering 408 to be detachably mounted to the hat 404. By one approach, each flap 424 also includes a fastening member 432 in the form of a rearwardly extending strip 434 located adjacent the distal ends 436 of the flaps 424 (FIG. 11 and FIG. 13). As best shown in FIG. 11, each of the strips 434 are configured to overlap each other and be wrapped or folded into a headband material 438 formed within the hat crown 412. The strips 434 are either inserted in the headband and/or fastened thereto via a fastener 440, such as a staple, pin, snap, strap, adhesive and the like extending through both strips 434 and the fabric material forming the headband. By overlapping the strips 434 and fastening them to the headband 438, the guarding device 402 can be removably mounted to the brim 414 because the guarding device 402 can be removed from the hat simply by removing the fastener 440 and unfolding the strips 434 and flaps 424 from around the brim 414. In this manner, the covering 408 and guarding device 402 thereof can be secured to the hat 404 without detracting from the hat's appearance by forming a sleeve encasing the hat's brim only. To this end, by securing the covering 408 to the hat as provided herein, the hat can be tried on by a consumer in the store because the brim sleeve 402 conforms to the hat's profile and does not hinder or block the hat's crown portion 412.

The body 403 of the brim sleeve 402 is preferably a paper, cardboard, fiberboard, laminate or other conformable packaging-type material that is sufficiently flexible and can be folded at the ends 426 and 428 rending it capable of conforming to the curvature of the hat brim 414. To this end, the covering 408 may include score lines, folds, creases, perforations or other indents 448, 446 to permit easier folding and to define intersections between the adjacent cover sections. The top surface 420 of the detachable covering 408 may also include a decorative outer layer to be used for various markings and other indicia such as labels, logos, and other instructions so that the brim sleeve 402 also functions as a product identifier or marketing label. For instance, the top surface may indicate that the light source may be tested by suggesting the hat includes a "try me feature".

The shield member or portion 410 of the brim sleeve may be a portion of the paperboard body or, preferably, include a separate structure formed from a molded plastic that is attached to a portion of the paperboard body 403 of the brim sleeve. By one approach, the shield member 410 includes a wall 442 formed from upstanding flanges 441 (FIGS. 11 and 11a) that can be positioned adjacent to and, preferably, partially or completely surround the hat switch 406. At the same time, the upstanding flanges 441 of the wall 442 also form a switch access opening 444 on a distal end 445 of the wall 442 to provide an opening for direct and intentional access to the switch 406 as generally illustrated in FIGS. 11 and 12. To this end, the plunger actuator 406a of the switch 406 is not covered by either the material forming the body 403 of the brim sleeve 402 or the plastic of the shield member 410, but still has the upstanding flange 441 of the wall 442 adjacent thereto to act as a barrier to prevent inadvertent actuation of the switch 406. Preferably, the shield 410 is formed from a plastic material and molded into the preferred annular shape. However, while the shield 410 is illustrated in the drawings as having an annular configuration, it will be appreciated that the guard 410 may be any shape so that as it is adjacent to and/or surrounds the switch and is capable of preventing unintended activation of the switch.

In one form, the shield wall 442 is formed from the upstanding flanges 441 and, in particular, a pair of upstanding flanges that form an annular structure arranged and configured to encircle the switch 406 when mounted to the hat. Turning again to FIG. 11a, the wall 442 includes the pair of upstanding wall flanges 454 and 456 generally extending toward each other to form a tapered wall configuration where the base of the wall 442 has a wider width than a distal end of the wall. The tapered configuration includes an outer wall flange 454 and an inner wall flange 456 that are on either side of the access opening 444 of the shielding member 410. This tapered configuration is advantageous because it provides enhanced strength to the shield wall 442.

When the shield 410 is a separate piece from the paperboard body of the detachable covering 408, it also includes a mounting flange 443 thereof so that it can be mounted by a fastener 443a (such as staples, pins, adhesive, and the like) to a corresponding mating surface 450 located on one of the brim sleeve body flaps 424 in a position so that when the body 403 is mounted to the brim 414 as described above, the wall 442 of the shield member 410 surrounds the brim mounted switch 406 as best illustrated in FIG. 11. To this end, the mounting flange 443 preferably extends generally orthogonal or approximately transverse to the wall 442 and extends from one side of the shield 410 as best shown in FIG. 11. This permits the shield 410 to extend away from one edge of the brim sleeve flap arms 424.

Figure 11A:
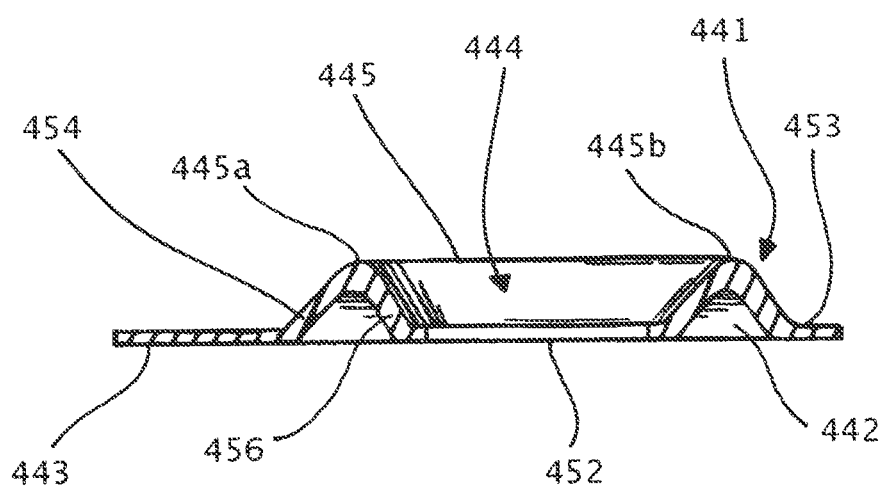
FIG. 11a is a cross-sectional view of a wall portion of the protective guard of the packaging material having an inner and outer flange portion configured to prevent inadvertent actuation of the activation switch.

The shield member 410 also preferably includes seating flanges for providing a flush engagement with the brim surface when mounted thereto. Turning to FIG. 11a, the shield member 410 includes an outer seating flange 453 adjacent the outer wall flange 454 and an inner seating flange 452 adjacent the inner wall flange 456. Each seating flange 453 and 452 is configured to sit flush with the brim surface so that the shielding member 410 can be mounted flush to the brim when the brim sleeve is secured thereto. More particularly, the outer seating flange 453 generally extends outwardly away from wall flange 454 and the inner seating flange 452 extends inwardly to the access opening 444 adjacent the inner flange wall 456.

Still referring to FIG. 11a, the inner and outer seating flanges 453 and 452 are spaced apart from one another at the base of the wall 442, which help provide enhanced stability of the shield member 410 while attached to the lighted hat 404 so as to keep the shielding device adjacent to and/or surrounding the hat switch 406. The inner seated flange 452 is connected to the inner vertical flange 456 and extends annularly and in a generally parallel direction to the hat brim 414 about an inner, lower edge of the access opening adjacent the hat brim. The inner seated flange 452 may rest generally flush against the lower surface of the hat brim 414 and generally encircle the activation switch 406. The outer seated flange 453 is connected to the outer vertical flange 454 and extends annularly and in a generally parallel direction to the hat brim 414. The outer seated flange 453 may also rest generally flush against the lower surface of the hat brim 414. Moreover, at least a portion of the outer seated flange 453 may be connected to the mounting flange 443 to connect the shield member 410 to the detachable covering 408.

The preferred annular shape of the shielding member 410 and upstanding flange 441 having the distal end 445 thereof spaced beyond the switch prevent inadvertent actuation of the activation switch 406 by providing barrier wall that surrounds the switch 406 and provides an blocking surface at multiple contact locations along the annular distal end 445 against an intruding object. For example, an object having a size larger than the access opening 444 and coming in contact with the shield member/portion 410 may contact various locations along the annular distal end 445 at the same time. In one form, the intruding object may contact two opposite locations (i.e., 445a and 445b in FIG. 11a) on opposite sides of the annular distal end 445 allowing the distal end 445 to support the intruding object at the two opposite locations above the activation switch 406 thereby preventing inadvertent activation of the switch 406 by the intruding object. By providing at least two points of contact, the wall 442 provides enhanced resistance from being crushed or deformed upon engaging a surface.

The guarding device 402 is advantageous because it keeps adjacent surfaces away from the power switch 406. One useful application is when a plurality of hats 404 are nested together for packaging and shipping to a store. Turning to FIG. 12, a plurality of lighted hats each having a crown 412 (not shown in FIG. 12) and a brim 414 are disposed in a nested configuration. In this example, this nested configuration includes a lower one of the lighted hats (414a) being nested together with an upper one of the lighted hats (411) such that the crown of the lower lighted hat is inserted into the crown of the upper light hat and the brim 414a of the lower lighted hat overlaps at least a portion of the brim 414 of the upper lighted hat (i.e., lower brim 414a overlays middle brim 414, which in turn overlays upper brim 414b). Each of the plurality of nested lighted hats has a spacer device in the form of the guarding device 402 mounted thereto to prevent inadvertent actuation of the activation switch 406 on each of the hat brims. As disclosed above, the guarding device 402 preferably includes the shield member 410. To provide guarding, the shield member wall 442 has a height H1 thereof that is greater than a distance the switch 406 extends beyond a surface of the brim 414 so that the distal end 445 of the shield 410 is spaced a distance H2 from the switch 406. In this manner, the guard 410 and in particular the wall 442 thereof keeps the brim 414a of the adjacent, lower nested hat 404a spaced from the activation switch 406 of the middle hat brim 411 because the shield wall 442 keeps the adjacent, nested brim 414a from contacting the middle hat switch 406. The height H1 of the guard wall 442 is also sufficiently high so that even if a fabric 411 covering the brim is pulled tight over the switch 406, the switch is still spaced from the top 445 of the guard wall 442.

Lighted hats may be displayed on a store shelf prior to purchasing by a consumer. Many times, a consumer may wish to test a lighted hat to evaluate how well the illumination source on the hat works. While on display, the switch access opening 444 associated with the shield member 410 provides a user with intentional and direct access to the activation switch 406. A user may therefore use a finger to directly enter the switch access opening 444 and intentionally activate the switch 406 so that the illumination or other accessory devices can be tested while the hat is displayed on the store shelf. As described above, this configuration still prevents against unintentional actuation of the activation switch while allowing a user direct access to intentionally actuate the switch. In this manner, the hat 404 can be shipped to the store with the power source 411 already installed without the concern that the activation switch be inadvertently turned on during shipment which can drain the power source thereof.

Figure 15:
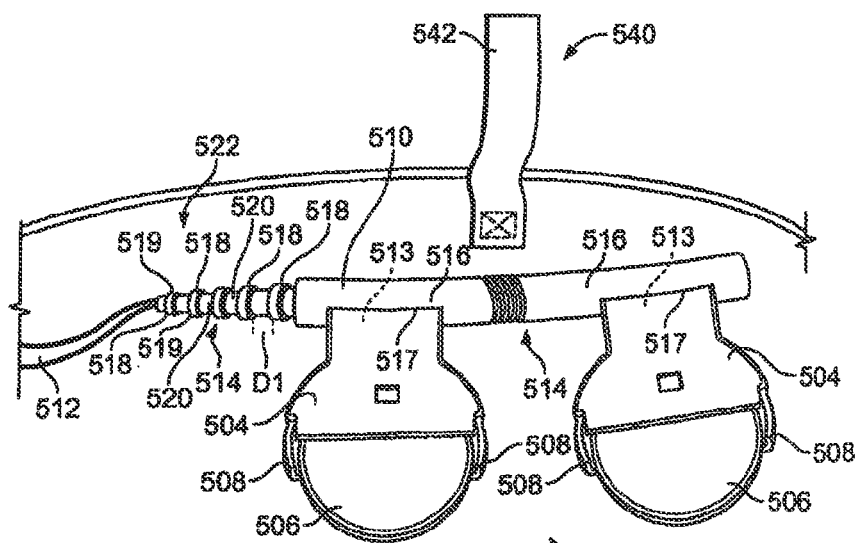
FIG. 15 is a perspective view of a battery holder configured to be attached to a lighted hat via a flexible strip and showing an elongate, resilient base member having a relatively flexible portion and a relatively rigid portion.
Figure 16:
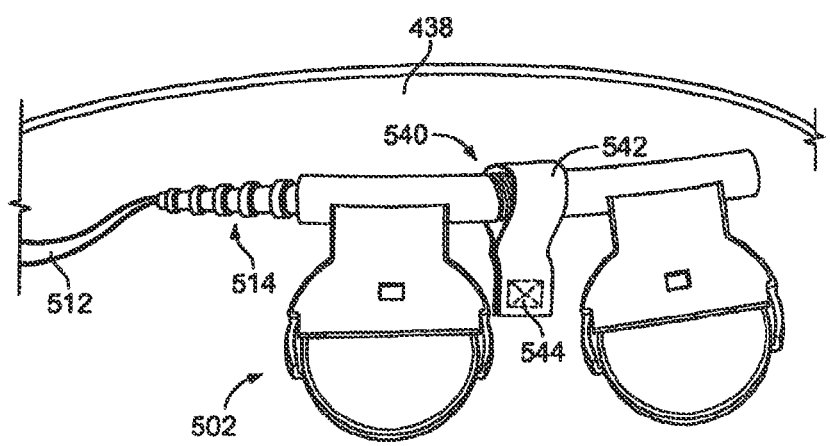
FIG. 16 is an elevational view of the battery holder showing the flexible strip fastening the base of the holder to the lighted hat.

Referring to FIGS. 11, 15, and 16, a flexible battery module 502 for use in the lighted headgear described herein is illustrated. As shown in FIG. 11, the battery module 502 is configured for insertion in the headband material 438 formed on the lower, inner portion of the hat crown 412. That is, on a typical baseball-style cap, the headband material 438 is folded inwardly to an interior space formed by the crown 412 to form a generally annular space between the headband 438 and the inner surface of the crown 412. The flexible battery module 502 is preferably inserted in this space and fastened to the hat band or crown. The module 502 is configured to be flexible to permit portions of the battery module 502 to flex and bend. In this regard, the module 502 may generally conform to the curvature of the hat crown 412 and provide a more comfortable wearing experience for an individual because the battery module 502 is capable to better conform to the curvature of the wearer's head with fewer rigid portions that can create a protrusion that may abut into the wearer's head. At the same time, the module 502 also includes more rigid portions that are configured to protect a connection with the battery.

Figure 17:
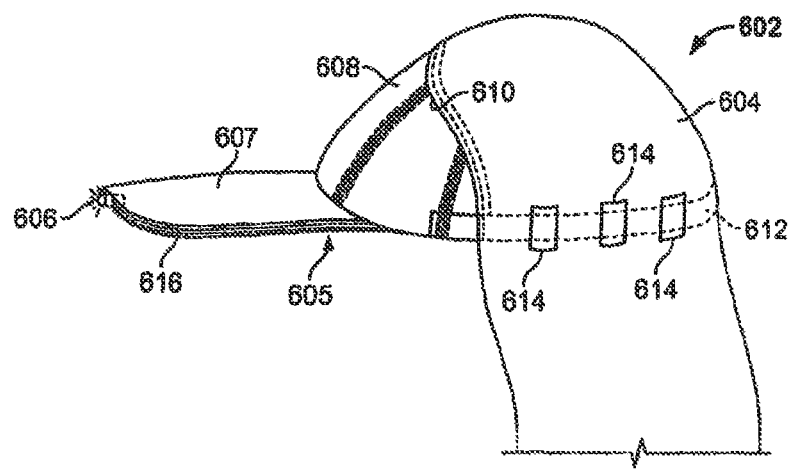
FIG. 17 is an elevational view of lighted headgear of a garment showing a brim portion with LEDs attached to a hood portion of the garment by a sweatband of a partial crown portion extending through interior loops the hood.

Turning to FIG. 17, one form of the module 502 is illustrated in more detail. As illustrated, the module 502 includes two battery receiving pockets 504, which are configured to each received a single battery 506, such as a thin, coin-cell type battery, in a generally snap-fit connection. For example, the battery 506 is preferably snapped into the pocket 504 by being snuggly received therein by spaced gripping fingers 508 on either side of the pocket 504. As described in more detail below, each pocket 504 is mounted to a base member 510 that encloses electrical wiring 512 and provides a rigid mounting portion for connection to the pockets 504 and also includes flexible bending portions for providing the ability of the module 502 to conform to the curvature of the hat.

The wiring 512 extends through the base to each of the batteries and out a distal end of the base where it can be connected to a circuit board, illumination source, switch, or other accessory (not shown). The base 510 provides rigid protection to an electrical connection 513 between the wires and each battery 506 that limits the amount of bending or flexing that can occur at this connection. While the module 502 is shown with two battery pockets 504, it will be appreciated that additional or fewer pockets may be included as needed to provide the desired power level to the hat and associated accessories.

In one form, the base 510 is an elongate tubular structure having an annular wall 512 forming a plastic tube through which the wiring 512 extends. The tube wall 512 includes multiple portions that include at least two relatively flexible portions 514 configured to permit the module 502 to bend or flex and also at least two relatively rigid portions 516 which form a rigid connection 517 to the battery pockets 504. The flexible portions 514 are formed from a series of annular bands 518 axially spaced along the length of the tubing with narrower tubing sections 520 in between the annular bands 518. The narrow tube sections 520 have a relatively thinner wall thickness compared to the rigid tube portions 516 and, therefore, permit the tubing portions 514 to flex or bend. The annular bands 518 have a relatively thicker wall dimension and can provide hard stops to limit the amount of bending of the flexible portions 514. To this end, as the portion 514 is flexed, upon sufficient bending, the outer edges 519 of the annular bands 518 will abut each other to limit the amount of bending. To control the amount of flexing of the tube, a spacing D1 between the annular bands 518 can be varied. For instance, greater spacing D1 will permit more bending of the flexible portion and narrower spacing D1 will permit less bending of the flexible portion.

Preferably, the base 510 includes two flexible portions 514. One flexible portion 514 is positioned between the two battery pockets 504 and rigid portions 516 to permit each battery pocket 504 to flex or bend relative to each other. The other flexible portion 514 is provided at the distal end 522 of the base 510 to provide flexibility at the location where the wiring enters the base 510.

Referring to FIG. 16, the module 502 is mounted to the headgear via a fastener 540. In one form, the fastener 540 is a loop of fabric material 542 that encircles the base 510 between each of the pockets 504 and is stitched 544 to the inside headband 438 of the hat. In this manner, the module 502 is conveniently attached to the hat, but permits ease of battery replacement because there is no other pocket, module, cover, or other material that needs to be unscrewed, removed, or opened in order to reach the battery. The user can unfold the headband 438 to access the batteries 506. While the fabric loop 542 is illustrated as one mounting method for the module 502, it will be appreciated that other type of mountings may be used to secure the module to the hat, such as but not limited to, snaps, Velcro, glue, fabric pockets, and other common fastening methods.

Referring to FIGS. 17-23, various embodiments of illuminated clothing 602 are illustrated. In general, the illuminated clothing 602 includes a hood portion 604, such as from a hood from a jacket or sweatshirt, combined with a hat portion 605 having an illumination source 606 thereon to provide illumination forwardly of a wearer when the hood is up around the wearer's head. The hat portion 605, which is coupled with the hood, includes a crown or partial crown 608 such as a visor portion and a brim portion 607 extending outward from a lower portion of the crown 608. As described in more detail below, the hat portion 605 preferably includes the illumination source 606 and other electrical components needed to energize the illumination source, but the electrical components may also be in the hood or other portions of the clothing. In this configuration, the hat and hood combination mimics the appearance of a separate hat covered by a hooded sweatshirt or jacket, but provides the advantage of the hat being mounted to the hood for stability. As further described below, the hat portion 605 may be fixed to the hood portion 604 or the hat portion 605 (i.e., crown or brim) may be removably mounted to the hood portion 604.

Referring more specifically to FIG. 17, one embodiment of the illuminated clothing 602 includes the hat portion 605 fixed to the hood 604. In this form of the illuminated clothing, the hat portion 605 is secured to the hood 604 by having the crown portion 608 fixed to the hood 604 and, in particular, fixed to an outer edge 610 of the hood 604. The crown 608 may be attached by stitching, gluing, and other fastening methods. Optionally, the crown 608 may be an extension of the hood fabric with or without a more rigid backing material (not shown) positioned on an inside surface of the hood fabric to form the curvature of the crown portion.

In one embodiment, the hat and hood combination also includes a headband 612 extending around the side and rear outer portions of the hood 604. The headband helps to position the hat portion 605 in a desired position on a wearer's head. By one approach, the headband 612 may be formed from an elastic material and extends around the sides and rear of the hood from one side of the hat portion 605 to the other. The headband 612 may be stitched to the hood or, as shown in FIG. 17, extend through one or more spaced loops 614 positioned on the inner surface of the hood 604.

The hat portion 605 includes the illumination source 606 and the necessary electrical components for energizing the illumination source 606. For example, the hat portion 605 may include any of or any portion of the previously described illuminated hats herein or described in related U.S. application Ser. No. 11/941,558. Preferably, the hat portion 605 has the illumination source 606 on an outboard edge 616 of the hat brim 607 and configured to provide illumination forwardly of the wearer. The embodiment shown in FIG. 17 including an assembly of the hat portion 605 fixed to the hood portion 604 provides a sturdy construction where the hat portion 605 and hood portion 604 are generally a single clothing piece.

Figure 18:
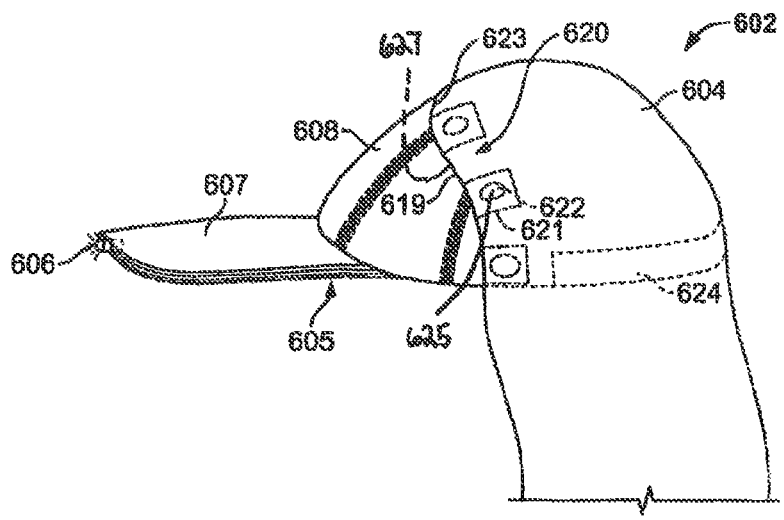
FIG. 18 is an elevational view of another form of lighted headgear for a garment showing a brim portion with LEDs and a crown portion that is removably mounted to the hood portion.

Referring now to FIG. 18, another embodiment of the illuminated clothing 602 is illustrated. In this embodiment, the hat portion 605 is removably mounted to the hood portion 604 by a fastener mechanism 620. In this manner, the hat portion 605 may be removed from the hood portion 604 so that the hood may be washed without needing to protect the electrical components in the hat portion 605 from water.

By one approach, the fastener mechanism 620 includes Velcro, snaps, pins, buttons, zippers, and other fastening methods. As shown, an outer edge 619 of the crown portion 608 includes a plurality of spaced fabric flaps 621 having a snap 622 thereon. Each of the snaps 622 is configured to be received in corresponding receiving snap members 625 secured to an inner surface 627 of the hood 604 such as adjacent an outer edge 623 of the hood 604. Optionally, the hood 604 may include an integral or separate headband 624, which may be part of the removable hat portion 605 or may be provided in inner portions of the hood 604 similar to the headband 612 described above.

Figure 19:
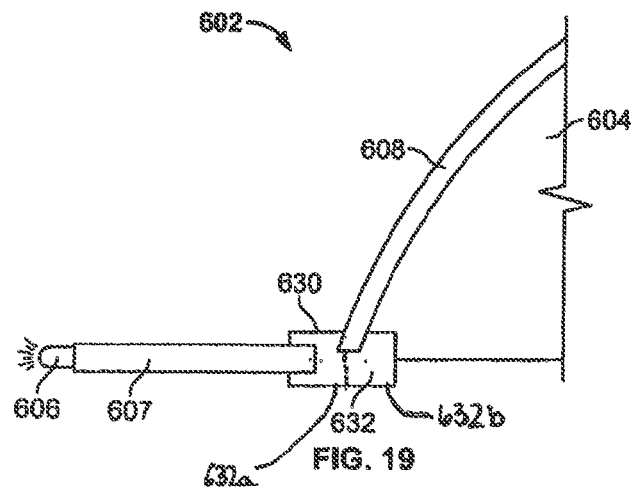
FIG. 19 is an elevational view of a lighted brim including LEDs that are detachably mounted to a crown portion.

Rather than having the crown portion 608 removably attached to the hood 604, the lighted clothing 602 may also include a removable hat brim 607. For example, as shown in FIG. 19, the hat brim 607 may be removably mounted to the hood 604 or to the crown portion 608 via a detachable fastener 632 including cooperating fastener portions 632a and 632b on both the brim and the hood 604 or crown portion 608. Similar to the previous embodiment, the removable brim 607 permits the electrical components housed therein to be separated from the hood 604 so that the hood 604 can be washed without damaging any of the electrical components. The fastener 632 may include any common fastening mechanism such as, but not limited to, snaps, Velcro, adhesive, zippers, buttons, tabs, pins, and other detachable fastening devices that allow for easy detachment and reattachment of the brim 607 relative to the hood 604 or crown portion 608 without damage thereto.

Figure 20:
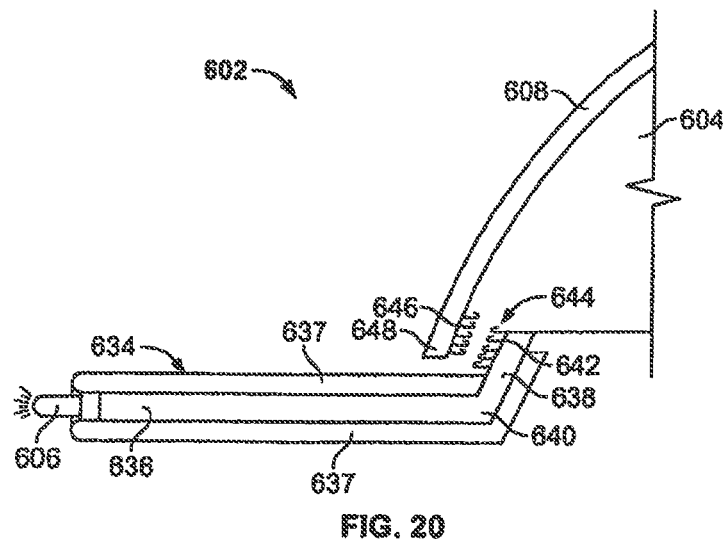
FIG. 20 is an elevational view of a lighted brim including LEDs that is removably mounted to a crown portion via a Velcro fastening system.

Turning to FIG. 20, one example a removable brim 634 is illustrated. In this embodiment, the brim includes a relatively rigid, shape retentive portion 636 covered by fabric upper and lower overlays 637. The shape retentive portion 636 includes an upwardly extending flange 638 along an inner edge 640 thereof. An outer surface 642 of the flange includes a fastener 644, such as Velcro, that is configured to removably mate with a corresponding fastener 646, such as Velcro, on a lower inner surface 648 of the hat crown 608 or lower inner surface of the hood 604. In this embodiment, the removable brim 605 includes the fabric 637 stretched across upper and lower surfaces of the shape retentive portion 636 similar to a traditional baseball-style cap so that when mounted to the crown and hood, the assembly appears to be a typical baseball cap.

Figure 21:
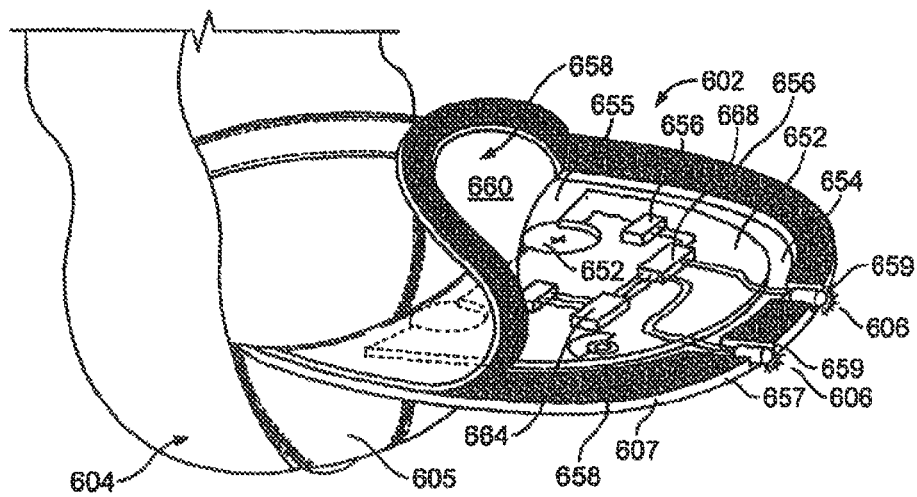
FIG. 21 is a perspective view of a self-contained lighted brim showing LEDs, a power source and a circuit board mounted to a removable light module accessible by a flap of fabric, detachably connected to the brim.

Turning now to FIG. 21, an alternative lighted clothing assembly 602 is illustrated. In this embodiment, the hat portion 605 includes a removable electronic module 652 that can be removed from the hat brim 607. In this embodiment, all electrical components (switches, circuit boards, batteries, and illumination sources) are mounted to the electrical module 652. In this manner, the electrical module 652 may be removed from the clothing so that the hood and hat combination can be easily washed without the electrical components.

More specifically, the brim 607 includes an inner cavity 654 defined by a brim outer wall 655 and an brim edge wall 656 extending along the brim outboard edge 657. The cavity 654 is sized to receive the module 652 therein. In order to position the illumination source 606 for outward projection of illumination, the edge wall 656 preferably includes slots 659 extending from the cavity 654 through the outer wall 656. To this end, the module 652 is inserted into the cavity 654 with the illumination sources placed in the slots 659.

To access the cavity 654, a lower fabric surface 658 of the brim 607 includes a flap 660 that may be peeled back to expose the cavity 654. The flap 660 is secured to the brim edge wall 656 by a fastener 658, shown here as Velcro but the fastener 658 may be any removable fastening mechanism like buttons, snaps, adhesive, and the like. In an alternative embodiment, as shown in FIG. 23, the electrical module 652 may be accessed via a zipper slot 674 provided in the lower surface 658 of the brim 607.

Figure 22:
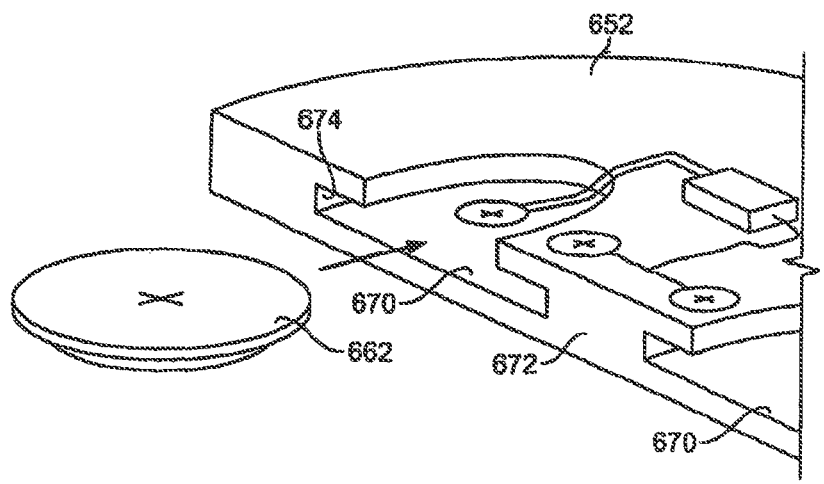
FIG. 22 is a partial, perspective view of the removable module of FIG. 21 showing a power source that can be received in a slot at the outer edge of the module.

Preferably, the module 652 includes all the components necessary to illuminate the power source 606. As shown, the module 652 includes a power source 662, a circuit board 664, an activation switch 666, and other electrical connections 668. It will be appreciated that the various electrical components shown on the module 652 are only exemplary and other electrical connections and components may be provided as needed for each particular circumstance. As shown in FIG. 22, the power source 662 is preferably received in slots 670 provided on an outer edge 672 of the module 652. In this manner, the power source 662, such as coin-type batteries may be conveniently slid into the slots 670. In order to provide a secure attachment, the slots may have an undercut groove 674 configured to receive the battery 662 in a snug fit.

It will be understood that various changes in the details, materials, and arrangements of the parts and components that have been described and illustrated in order to explain the nature of the lighted hats and garments as claimed may be made by those skilled in the art within the principle and scope of the invention.

The invention claimed is:

1. Headgear comprising:
a head-fitting portion configured to be received on a wearer's head;
a brim portion having top and bottom surfaces and an outboard edge extending between the top and bottom surfaces;
a camera having a lens thereof and being mounted to the brim portion so that the camera overlaps the brim portion in engagement therewith between the top and bottom surfaces thereof;
a power source mounted to at least one of the head-fitting portion and the brim portion, and electrically connected to the camera; and
a control member mounted to the brim portion for operating the camera.

2. The headgear of claim 1 wherein the lens of the camera is mounted generally centrally to a front portion of the outboard edge of the brim portion.

3. The headgear of claim 1 wherein the lens of the camera is mounted adjacent at least one of the top and bottom surfaces of the brim portion.

4. The headgear of claim 1 wherein the control member comprises a switch having momentary positions corresponding to zoom functions for the camera.

5. The headgear of claim 1 wherein the camera comprises a digital camera and operates at less than 30 frames per second.

6. The headgear of claim 1 wherein the camera lens is arranged to generally face forwardly from the brim portion, and
one or more light sources mounted to at least one of the head-fitting portion or the brim portion so that the one or more light sources are positioned to project light generally forwardly of the brim portion.

7. The headgear of claim 6 wherein the camera is adapted for taking pictures, and the one or more light sources are electrically connected to the camera to function as a flash when a picture is taken with the camera.

8. Headgear comprising:
a head-fitting portion configured to be received on a wearer's head;
a brim portion having upper and lower major surfaces and an outboard edge extending between the upper and lower major surfaces;
a camera having a lens thereof mounted to the brim portion, wherein the camera lens is arranged to generally face forwardly from the brim portion;
a power source mounted to at least one of the head-fitting portion and the brim portion, and electrically connected to the camera;
a control member mounted to the brim portion for operating the camera;
one or more light sources mounted to at least one of the head-fitting portion or the brim portion so that the one or more light sources are positioned to project light generally forwardly of the brim portion; and
a thermally conductive material having a thin, flat configuration and having a major heat dissipating portion mounted adjacent to the brim upper major surface and contacting at least one of the one or more light sources or the camera in order to dissipate heat generated therefrom.

9. Headgear comprising:
a head-fitting portion configured to be received on a wearer's head;
a brim portion having top and bottom surfaces and an outboard edge extending between the top and bottom surfaces;
a camera having a lens thereof mounted to the brim portion;
a power source mounted to at least one of the head-fitting portion and the brim portion, and electrically connected to the camera; and
a control panel having a panel portion mounted to the brim portion to extend therealong and in engagement therewith and a switch associated with the panel portion and electrically connected to the camera.

10. The headgear of claim 9 wherein the camera is adapted for taking at least one of pictures or video and the control panel further comprises a connection device for downloading images or video taken by the camera to external devices.

11. The headgear of claim 9 wherein the camera is adapted for taking pictures and video, and the control panel further comprises a second switch having an off condition, a snapshot condition, and a video condition for corresponding operating states of the camera.

12. Headgear comprising:
a head-fitting portion configured to be received on a wearer's head;
a brim portion having upper and lower major surfaces and an outboard edge extending between the upper and lower major surfaces;

a camera having a lens thereof mounted to the brim portion;
a power source mounted to at least one of the head-fitting portion and the brim portion, and electrically connected to the camera;
a printed circuit board connected to the camera; and
a first thermally conductive member having a thin, flat configuration and mounted between the brim upper major surface and the printed circuit board in order to dissipate heat generated therefrom.

13. The headgear of claim 12 further comprising a second thermally conductive member mounted below the printed circuit board to dissipate heat generated therefrom.

14. The headgear of claim 13 wherein the camera is a digital camera and wherein the first and second thermally conductive members are further configured to block radio frequency emissions generated by operation of the digital camera.

15. The headgear of claim 14 wherein the digital camera operates at least at 30 frames per second.

16. Headgear comprising:
a head-fitting portion configured to be received on a wearer's head;
a brim portion having top and bottom surfaces and an outboard edge extending between the top and bottom surfaces;
a camera having a lens thereof mounted to the brim portion;
a power source mounted to at least one of the head-fitting portion and the brim portion, and electrically connected to the camera; and
a view finder mounted to the bottom surface of the brim portion to be located under the brim portion for displaying an image generated by the camera lens.

17. The headgear of claim 16 wherein the view finder is pivotably mounted to the brim portion bottom surface between a stored position to extend along the brim portion and an operative position to project downwardly from the brim portion bottom surface for viewing of the image generated by the camera lens.

18. Lighted headgear comprising:
a brim having a perimeter edge with an opening formed in the edge thereof;
at least one light source mounted to the brim; and
a rotary switch mounted in the opening of the brim perimeter edge having a portion received in the brim and a portion exposed for being turned by a user to selectively energize and de-energize the at least one light source,
wherein the rotary switch includes a push button mechanism so that the rotary switch can be turned and also pushed.

19. The lighted headgear of claim 18 further comprising a power source in electrical communication with the rotary switch to selectively energize the at least one light source.

20. The lighted headgear of claim 18 further comprising upper and lower brim covering portions, and wherein the rotary switch is partially disposed between the upper and lower brim covering portions.

* * * * *